US011285932B2

(12) United States Patent
Bowman et al.

(10) Patent No.: US 11,285,932 B2
(45) Date of Patent: Mar. 29, 2022

(54) WHEEL CHOCK ALARM SYSTEMS AND RELATED METHODS

(71) Applicant: Rite-Hite Holding Corporation, Milwaukee, WI (US)

(72) Inventors: Kenneth C. Bowman, Cedarburg, WI (US); Leonard Kikstra, Jackson, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 738 days.

(21) Appl. No.: 15/614,229

(22) Filed: Jun. 5, 2017

(65) Prior Publication Data

US 2018/0345946 A1 Dec. 6, 2018

(51) Int. Cl.
 *B60T 17/22* (2006.01)
 *B60T 3/00* (2006.01)

(52) U.S. Cl.
 CPC .............. *B60T 17/22* (2013.01); *B60T 3/00* (2013.01)

(58) Field of Classification Search
 CPC .................................... B60T 17/22; B60T 3/00
 See application file for complete search history.

(56) References Cited

U.S. PATENT DOCUMENTS

| 4,122,629 A | 10/1978 | Rennick |
| 4,817,768 A * | 4/1989 | Schumacher ............ B64G 1/38 |
| | | 188/378 |
| 6,336,527 B1 | 1/2002 | Metz |
| 6,354,128 B1 * | 3/2002 | Donini ................... B21B 31/16 |
| | | 72/10.1 |
| 6,443,945 B1 | 9/2002 | Marchitto |
| 7,032,720 B2 | 4/2006 | Jette et al. |
| 8,464,846 B2 | 6/2013 | Andersen et al. |
| 8,723,344 B1 * | 5/2014 | Dierickx ................. F03G 7/08 |
| | | 290/1 R |
| 9,126,775 B2 | 9/2015 | Brooks et al. |
| 9,212,797 B2 | 12/2015 | Jeong |
| 9,539,995 B2 | 1/2017 | Metz et al. |

(Continued)

FOREIGN PATENT DOCUMENTS

| EP | 2944522 | 11/2015 |
| FR | 2672578 | 8/1992 |

(Continued)

OTHER PUBLICATIONS

International Searching Authority, "Invitation to Pay Additional Fees and Partial Search Report," issued in connection with international Patent Application No. PCT/US2018/035300, dated Aug. 20, 2018, 17 pages.

(Continued)

*Primary Examiner* — Melody M Burch
(74) *Attorney, Agent, or Firm* — Hanley, Flight & Zimmerman, LLC

(57) ABSTRACT

Example vehicle restraint systems and related methods are disclosed. An example vehicle restraint system includes a wheel chock having an inclined tire-engaging surface, where the wheel chock is movable to an installed position at which the wheel chock is to engage the freight transporter. The vehicle restraint system includes a take-up reel and a retractable elongate member to be at least partially wrapped around the take-up reel. The retractable elongate member to extend between the wheel chock and a platform structure.

24 Claims, 14 Drawing Sheets

(56) References Cited

U.S. PATENT DOCUMENTS

| | | |
|---|---|---|
| 2003/0159892 A1 | 8/2003 | Jette |
| 2005/0226705 A1 | 10/2005 | Wilson |
| 2006/0051196 A1 | 3/2006 | McDonald |
| 2006/0144649 A1 | 7/2006 | Jette |
| 2006/0181391 A1 | 8/2006 | McNeill et al. |
| 2008/0042865 A1 | 2/2008 | Shephard et al. |
| 2008/0124203 A1 | 5/2008 | McDonald |
| 2009/0026022 A1 | 1/2009 | Andersen et al. |
| 2009/0255158 A1 | 10/2009 | Vait et al. |
| 2009/0267744 A1 | 10/2009 | Penot |
| 2010/0260586 A1 | 10/2010 | Manone et al. |
| 2011/0168501 A1* | 7/2011 | Henry ............... B60T 3/00 188/32 |
| 2011/0290596 A1* | 12/2011 | Perkins ............. B60T 3/00 188/32 |
| 2013/0327914 A1 | 12/2013 | McNeill et al. |
| 2017/0008498 A1 | 1/2017 | Metz et al. |

FOREIGN PATENT DOCUMENTS

| | | |
|---|---|---|
| FR | 2914914 | 10/2008 |
| NL | 157253 | 7/1978 |
| WO | 2009032372 | 3/2009 |

OTHER PUBLICATIONS

International Searching Authority, "International Search Report," issued in connection with international Patent Application No. PCT/US2018/035300, dated Oct. 16, 2018, 9 pages.

International Searching Authority, "Written Opinion," issued in connection with international Patent Application No. PCT/US2018/035300, dated Oct. 16, 2018, 15 pages.

International Bureau, "International Preliminary Report on Patentability," issued in connection with international Patent Application No. PCT/US2018/035300, dated Dec. 19, 2019, 15 pages.

European Patent Office, "Communication Pursuant to Rules 161 (1) and 162 EPC," issued in connection with European Patent Application No. 18733747.2, dated Jan. 22, 2020, 4 pages.

Intellectual Property Australia, "Examination Report No. 1," issued in connection with Australian Patent Application No. 2018280035, dated Sep. 1, 2020, 6 pages.

* cited by examiner

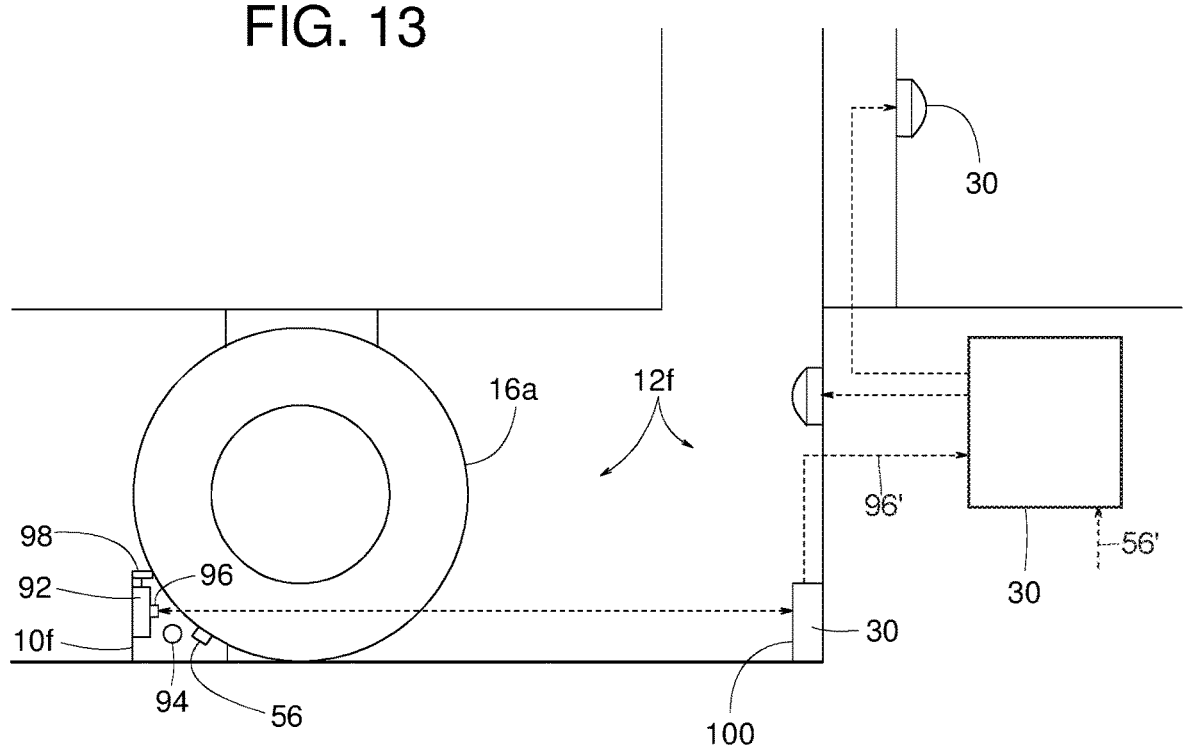
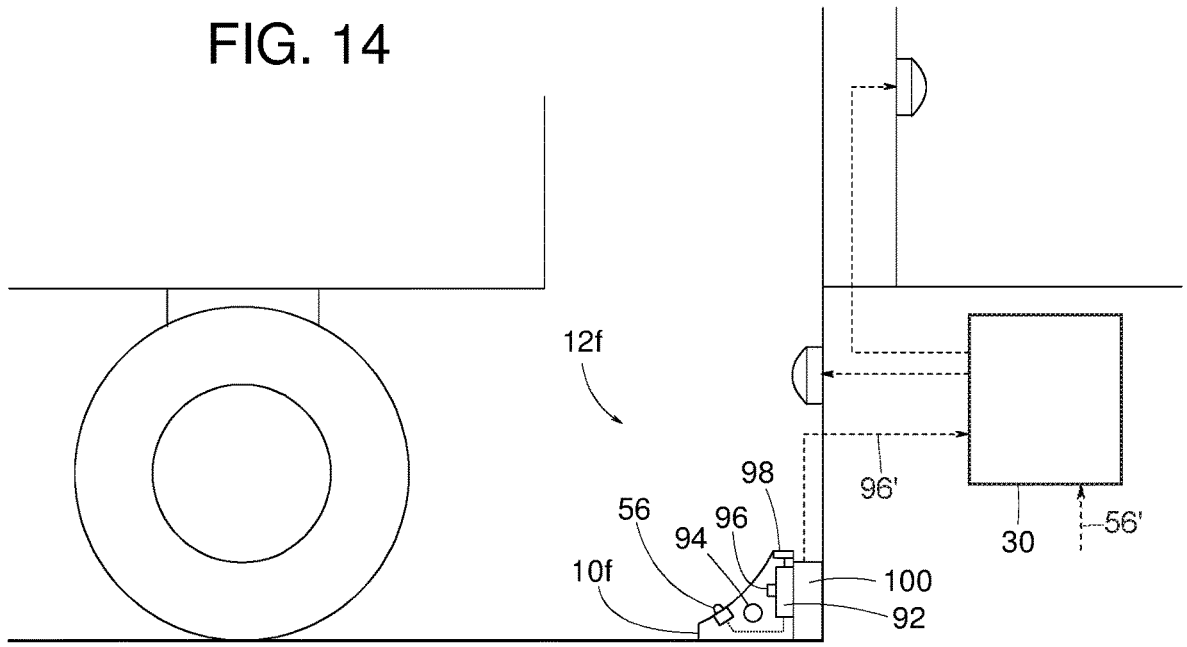

WHEEL CHOCK ALARM SYSTEMS AND RELATED METHODS

FIELD OF THE DISCLOSURE

This disclosure generally pertains to vehicle restraints and, more specifically, to wheel chock alarm systems and related methods.

BACKGROUND

When a truck, trailer or some other vehicle is parked at a loading dock, often some sort of vehicle restraint is used to keep the truck from inadvertently moving away from an elevated platform of the dock. The vehicle restraint allows a forklift truck to safely drive between the dock platform and the truck to load and/or unload the cargo inside the truck.

There are a variety of vehicle restraints available that can be installed at a loading dock for engaging the truck's RIG (Rear Impact Guard), also known as an ICC bar. An ICC bar is a beam that extends horizontally across the rear of a truck, just below the truck bed. Its primary purpose is to prevent an automobile from under-riding the truck in a rear-end collision. However, not all trucks have an ICC bar that can be readily engaged by an ICC-style restraint. Moreover, ICC bars are not prevalent outside the United States, so in those cases a wheel restraint can be used for blocking one or more of the truck's wheels.

Perhaps the most common wheel restraint is a wheel chock that wedges between the driveway and the underside of the wheel. However, wheel chocks often slip out of position on driveways that are slippery due to, for example, oil, rain, ice, sand, gravel or dirt. Moreover, wheel chocks usually are loose items that do not permanently attach to the loading dock area, so they often get misplaced. Also, conventional wheel chocks may not be suited for use with shipping containers that are supported by legs, rather than wheels.

U.S. Pat. No. 7,032,720 discloses an example wheel chock that is coupled to the loading dock by way of an articulated arm. To help prevent the chock from slipping out of a wheel-blocking position, the chock can be placed in mating engagement upon a serrated base plate that is anchored to the driveway.

BRIEF DESCRIPTION OF THE DRAWINGS

FIG. 13 is a schematic side view similar to FIG. 4 but showing the example loading dock implemented with yet another example wheel chock constructed in accordance with the teachings disclosed herein, where the example wheel chock includes an example portable power storage device.

FIG. 14 is a schematic side view similar to FIG. 13 but showing the example wheel chock at an example docking station.

DETAILED DESCRIPTION

Figure 1:
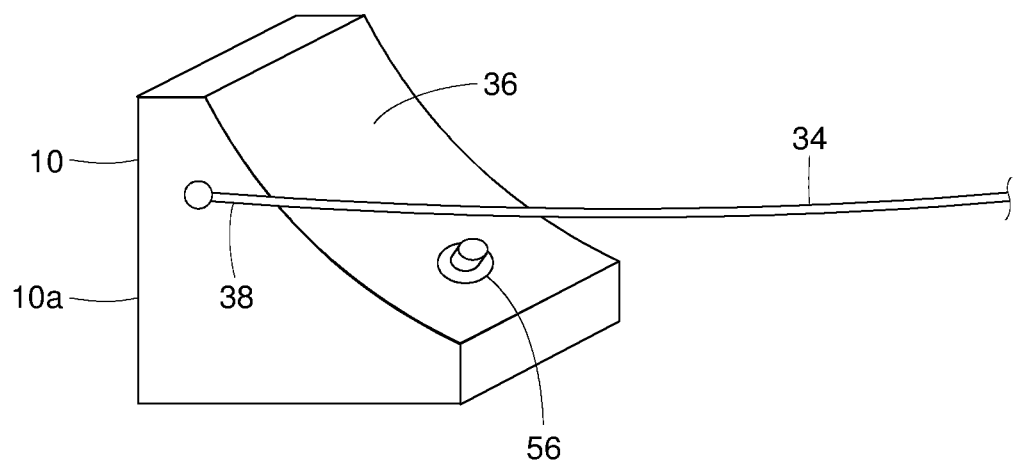
FIG. 1 is a perspective view of a wheel chock constructed in accordance with the teachings disclosed herein.

Example restraint systems and methods disclosed herein monitor movement (e.g., a change in position) of a manually placed wheel chock. Example restraint systems and methods disclosed herein (e.g., restraint systems 12a-12g) emit an alarm when a parked freight transporter (e.g., a truck, trailer or wheel-less shipping container) being engaged by the wheel chock slips (e.g., moves away from a loading dock) and forces the wheel chock a certain delta distance away from a platform structure of a loading dock. To detect movement of the wheel chock, example vehicle restraint systems disclosed herein include a measurement system to measure a distance between a wheel chock and a reference (e.g., a wall of a loading dock, a platform structure, a take-up reel, etc.). In some examples, a wheel chock of the example restraint systems disclosed herein is tethered to a retractable cable that wraps around a spring-loaded reel. In some examples, to detect a position of the wheel chock, example restraint systems disclosed herein employ a rotation sensor to measure a rotation of the reel to measure movement of the wheel chock. In some examples, to detect a position of the wheel chock, example restraint systems disclosed herein employ a laser, ultrasonic signal, infrared radiation or some other wireless communication link to detect movement of the wheel chock and/or measure a distance of the wheel chock relative to a reference (e.g., the reel, a front face or wall of a loading dock, etc.).

FIGS. 1-15 show example wheel chocks 10 (e.g., wheel chocks 10a-g) of example restraint systems 12 (e.g., restraint systems 12a-g) for restraining and/or monitoring a position of a freight transporter 14 parked near or adjacent a platform structure 22 of a loading dock 20. The term, "freight transporter" refers to any movable container for carrying cargo by vehicle, train or ship. Examples of the freight transporter 14 include, but are not limited to, a vehicle 14a (e.g., truck, trailer, etc.) and/or a shipping container 14b (e.g., swap body, ISO container, etc.).

In the illustrated examples, the freight transporter 14 includes a support member 16 that rests upon a driveway 18 when parked at the loading dock 20. The term, "support member," as used with reference to a freight transporter, refers to any weight bearing device upon which the freight transporter 14 rests its weight. Examples of the support member 16 include, but are not limited to, a wheel 16a and/or a fixed or retractable leg 16b. The term, "wheel" encompasses both a tire and a tire/wheel assembly. The term, "wheel chock," refers to any structure having an inclined tire-engaging surface (straight or curved), where the tire-engaging surface is adapted to engage the outer diameter of the wheel 16a and/or any structure adapted to engage the support member 16.

In some examples, the loading dock 20 includes the driveway 18 leading to a platform structure 22 with a building doorway 24 above platform structure 22. An elevated floor 26 of the platform structure 22 may be at a similar height (e.g., at about the same height) as a cargo bed of the freight transporter 14 to enable cargo to be readily transferred through the building doorway 24 between the floor 26 of the platform structure 24 and the interior of the freight transporter 14. In some examples, the platform structure 22 includes a conventional dock leveler to provide a convenient adjustable bridge across which material handling equipment can travel between the platform structure 22 and the freight transporter 14.

When the freight transporter 14 is parked within a predetermined (e.g., safe) distance in front of the platform structure 22, the freight transporter 14 might shift and/or move forward to a position (e.g., a less safe position) further away from the platform structure 22. In some such instances, the freight transporter 14 may shift or move while the wheel chock 10 remains fully engaged with the support member 16 (e.g., the wheel 16a or the leg 16b) of the freight transporter 14, as the freight transporter 14 forces the wheel chock 10 to move in a direction further away from the platform structure 22. Such movement of the freight transporter 14 can be caused by the jostling of the freight transporter 14 during loading and/or unloading operations. Also, in cases where the freight transporter 14 is the vehicle 14a, the driver of the vehicle 14a might accidentally drive away from the platform structure 22 before the loading and/or unloading operations are complete.

The restraint systems 12 disclosed herein employ a measurement system to measure a distance between the wheel chock 10 and a reference (e.g., the platform structure 22) to detect if the wheel chock 10 moves a distance greater than a predetermined distance relative to a wheel chock blocking position. In some examples, the measurement system includes one or more sensors (e.g., rotational sensors 50, 50', a transmitter 66 and a receiver 62, a transceiver 96, a blocking position sensor 56, etc.) that provide one or more position feedback signals to an electrical system 30 for interpretation and/or processing to detect when any such adverse shifting of the wheel chock 10 occurs due to movement of the freight transporter 14. In some examples, based on a determination of adverse shifting of the wheel chock 10, example restraint systems 12 disclosed herein emit an alarm 28 (FIG. 4) to warn or alert personnel in the area or vicinity of the platform structure 22 and/or the loading dock 20.

In the example shown in FIGS. 1-4, the example restraint system 12a has a measurement system including an example wheel chock 10a, the electrical system 30, an example take-up reel 32, and an example retractable elongate member 34 extending between the wheel chock 10a and the take-up reel 32. The term, "retractable elongate member," refers to a member that is sufficiently flexible to wrap around a take-up reel. Examples of the retractable elongate member 34 include, but are not limited to, a cable, a chain, a strap, a rope, a wire, a cord, etc. In some examples, the retractable elongate member 34 is electrically isolated (e.g., from electrical system 30 or other electrical system(s) and/or component(s). In other words, some examples of the retractable elongate member 34 are not used as an electrical conductor. In some examples, t electrically isolating the retractable elongate member 34 makes restraint system 12a simpler and/or less expensive to manufacture, install and/or assemble.

In the illustrated example, the wheel chock 10a has a curved inclined tire-engaging surface 36. In some examples, the tire-engaging surface 36 may be straight or curved towards the wheel. The wheel chock 10a can be manually positioned selectively between an initial or stored position (e.g., FIG. 2) when the wheel chock 10a is not in use and a blocking position installed in front of the wheel 16a to block forward movement of the vehicle 14a (FIG. 3).

The take-up reel 32, in this example, is mounted at a fixed location near the platform structure 22. The retractable elongate member 34 has one end 38 attached to wheel chock 10a and an opposite end 40 wrapped around and/or attached to the take-up reel 32. The take-up reel 32, in some examples, is spring loaded to continuously urge retraction of the retractable elongate member 34 around a barrel of the take-up reel 32 and, thus, urges the wheel chock 10 to the stored position (e.g., the initial position).

Electrical system 30 is in signal communication with a position sensor of the take-up reel 32. The term, "processor" refers to any apparatus with circuitry including, but not limited to, a computer, programmable logic controller, logic circuit, a microprocessor and/or any other apparatus for monitoring or controlling the state of one or more devices. Examples of devices include, but are not limited to, electromechanical switches, proximity switches, Hall Effect sensors, magnet switches photoelectric eyes, a laser emitter/sensor, an ultrasonic emitter/sensor, relays, encoders, resolvers, lights, audible alarms, and/or various combinations thereof, and/or any other sensor(s) or device(s). The electrical system 30 of the illustrated example emits an alarm 28 such as an audible signal (e.g., horn, buzzer, bell tone, etc.) and/or a visual signal (e.g., flashing light, continuous light, red light, green light, a graphic and/or any other visual signal(s)). For example, the alarm 28 of the illustrated example projects a warning (e.g., a light or audible warning) in a forward direction 42 toward a driver of the vehicle to provide notification to the drive, in a rearward direction 44 to provide notification to dockworkers inside the building and/or any other direction(s).

In one example sequence of operation, the vehicle 14a backs into the loading dock 20 (as indicated by arrow 46) to an initial parked position (FIG. 2) that is within a predetermined distance (e.g., a distance between about four inches and eighteen inches) from a front face 48 of the platform structure 22. The wheel chock 10a is manually moved from the stored position (FIG. 2) to the installed position (FIG. 3) in front of the wheel 16a such that the tire-engaging surface 36 engages an outer diameter of the wheel 16a. Upon moving the wheel chock 10a from the stored position to the installed position, the retractable elongate member 34 is pulled partially out from the take-up reel 32, which causes the take-up reel 32 to rotate.

As retractable elongate member 34 extends and reel 32 rotates, a rotation sensor 50 provides the electrical system 30 with a feedback signal 52 in response to the rotation of reel 32. Based on the feedback signal 52, the electrical system 30 of the illustrated example monitors or detects a distance (e.g., a first distance 76 or a second distance 82 of FIGS. 2 and 3, respectively, the distance 60, etc.) that the wheel chock 10a moves away from the initial position (e.g., in a direction away from the take-up reel 32 and/or the platform structure 22). The term, "rotation sensor" refers to any electrical device that provides a feedback signal in response to a turning member, where the rotation is relative, of course. Examples of rotation sensors include, but are not limited to, encoders, resolvers, rotating magnet switches, electromechanical magnet switches, rotating Hall Effect devices, a photoelectric eye viewing rotating optical targets, and/or various known electrical means for sensing discrete discontinuities 54 of a rotating member. Discrete discontinuities 54 are schematically illustrated to represent various examples of known discrete discontinuities including, but not limited to, magnets, optical targets, protrusions, holes, reflectors, ferrous bars, etc.

The electrical system 30 of the illustrated example determines whether the wheel chock 10a is at the installed position (e.g., the wheel chock 10a is adjacent, or in direct engagement with, the wheel 16a) based on the received feedback signal 52 from the rotational sensor 50. In some examples, for instance, electrical system 30 (e.g., via a logic circuit, gate logic, etc.) interprets and/or analyzes the feedback signal 52 to determine or detect that the wheel chock 10a is at the blocking or installed position if: (a) the wheel chock 10a has been moved at least a predetermined distance (e.g., a distance greater than 2 feet) from the initial position; and (b) the wheel chock 10a remains fixed or stationary at that distance for a predetermined period of time (e.g., a period of time between about 5 seconds and 10 seconds).

In addition or alternatively, to detect, determine and/or verify that the wheel chock 10a is at the installed position, the electrical system 30 and/or the wheel chock 10a may include a blocking position sensor 56 (e.g., an electrical switch, an electro-mechanical switch) positioned on (e.g., the tire-engaging surface 36 of) the wheel chock 10a that provides or communicates a feedback signal 56' to the electrical system 30 for interpretation and/or processing. For example, the blocking position sensor 56 of the illustrated example is an interrupted state when the inclined surface 36 of the wheel chock 10a is in direct contact or engagement with the wheel 16a (e.g., the blocking position sensor 56 is in a depressed condition relative to the inclined surface 36) and an uninterrupted state (e.g., a deactivated or non-triggered condition) when the wheel chock 10a is disengaged from the wheel 16a (e.g., the blocking position sensor 56 is in a non-depressed condition relative to the inclined surface 36). The interrupted/uninterrupted states of the blocking position sensor 56 are communicated to the electrical system 30. In some examples, the blocking position sensor 56 may be a light sensor, a proximity sensor, and/or any other type of sensor(s) that detects engagement between (e.g., the tire-engaging surface 36 of) the wheel chock 10a and the wheel 16a.

The electrical system 30 of the illustrated example can be performed by various means, examples of which include, but are not limited to, a software algorithm of a computer, ladder diagram program of a programmable logic controller, a suitable arrangement of electromechanical switches and relays, and/or a logic circuit.

In some examples, electrical system 30 inhibits activation of the alarm 28 when the wheel chock 10a is in the stored and/or installed position. However, if the freight transporter 14 shifts from the initial parked position (FIGS. 2 and 3) to a relocated position (FIG. 4) and that movement causes or forces the wheel chock 10a to move at least a predetermined delta distance 60 (e.g., at least two to six inches) from the blocking or installed position (FIG. 3) to a displaced position (FIG. 4), the electrical system 30 of the illustrated example triggers or activates the alarm 28 (e.g., to emit an audible and/or visual signal). In some examples, the alarm 28 is automatically deactivated when the electrical system 30 detects and/or determines movement of the wheel chock 10a toward the stored position (e.g., toward loading dock 20) and/or the wheel chock 10a returns to the installed position. In other examples, the alarm 28 is deactivated by manually resetting electrical system 30 to a non-alarm state of operation or condition.

Figure 2:
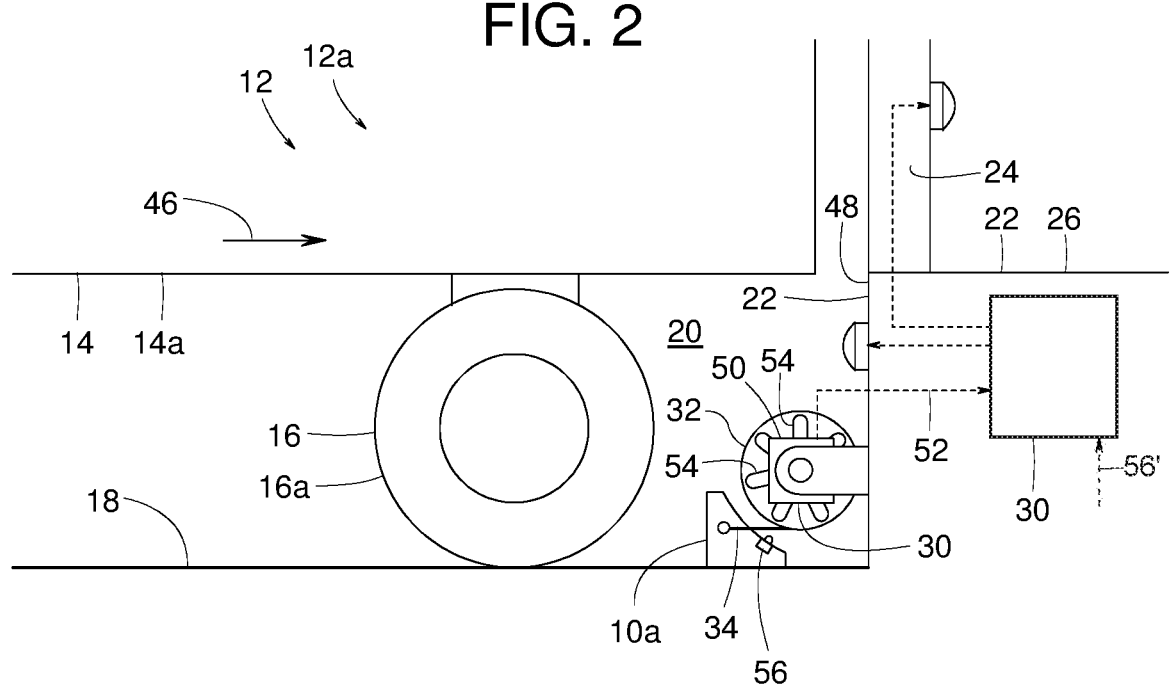
FIG. 2 is a schematic side view of an example loading dock implemented with the example wheel chock shown in FIG. 1, where a freight transporter is shown at an example initial parked position, and the example wheel chock is shown at an example stored position.
Figure 3:
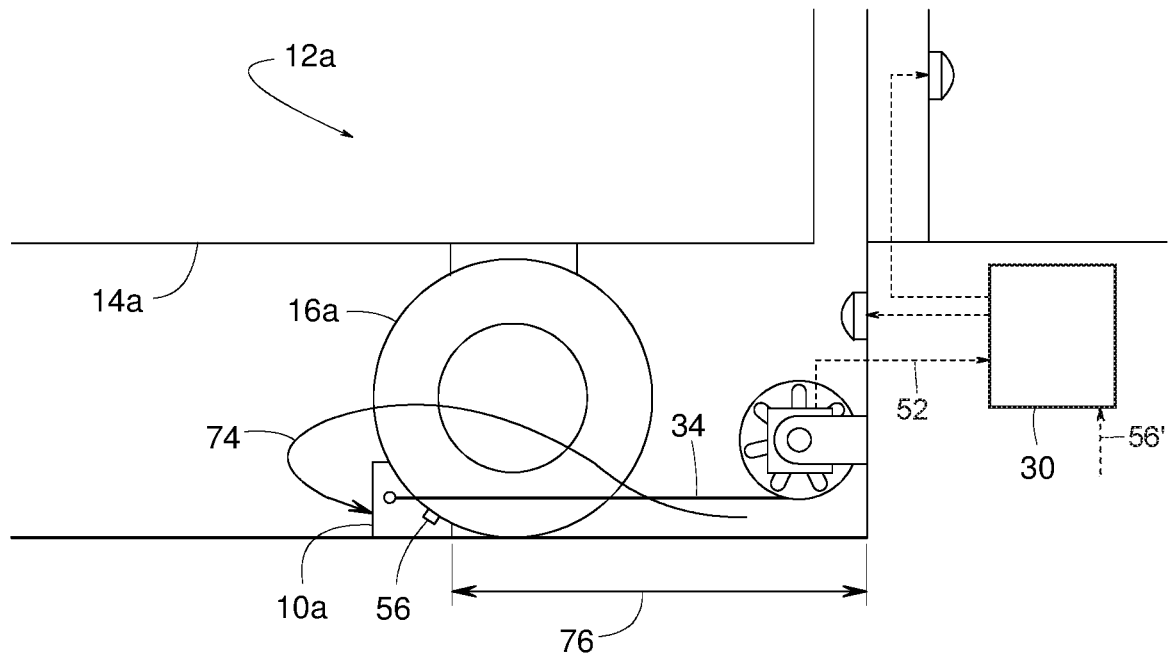
FIG. 3 is a schematic side view similar to FIG. 2, but showing the example wheel chock at an example installed position while the freight transporter is at the initial parked position.
Figure 4:
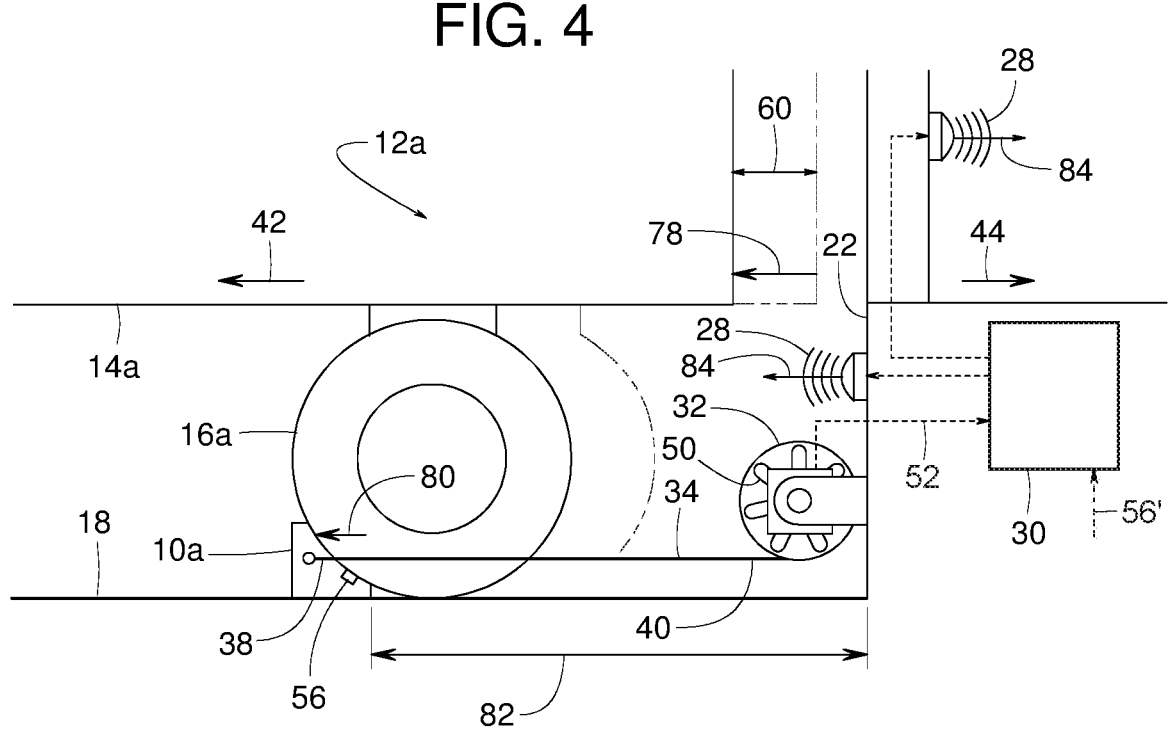
FIG. 4 is a schematic side view similar to FIGS. 2 and 3, but showing the freight transporter in an example relocated position and the example wheel chock in an example displaced position.

Referring to FIG. 2, arrow 46 represents parking the freight transporter 14 at an initial parked position on the driveway 18 in front of the platform structure 22 of the loading dock 20. Arrow 74 of FIG. 3 represents placing the wheel chock 10 at the installed position such that the wheel chock 10 engages the support member 16 of the freight transporter 14 at the initial parked position, where the wheel chock 10 is at the first distance 76 from the platform structure 22 when the wheel chock 10 is at the installed position. Arrow 78 of FIG. 4 represents the freight transporter 14 moving in forward direction 42 away from the platform structure 22 to a relocated position on driveway 18. Arrow 80 of FIG. 4 represents the support member 16 causing or forcing the wheel chock 10 from the installed position to a displaced position in reaction to the freight transporter 14 moving to the relocated position, where the wheel chock 10 is at the second distance 82 from the platform structure 22 when the wheel chock 10 is at the displaced position. In the illustrated example, the second distance 82 minus first distance 76 is equal to a delta distance 60. Arrow 84 of FIG. 4 represents electrical system 30 detecting that the wheel chock 10 has moved the delta distance 60 from the installed position to the displaced position. Arrow 84 of FIG. 4 represents electrical system 30 emitting the alarm 28 in response to electrical system 30 detecting that the wheel chock 10 has moved the delta distance 60.

Figure 5:
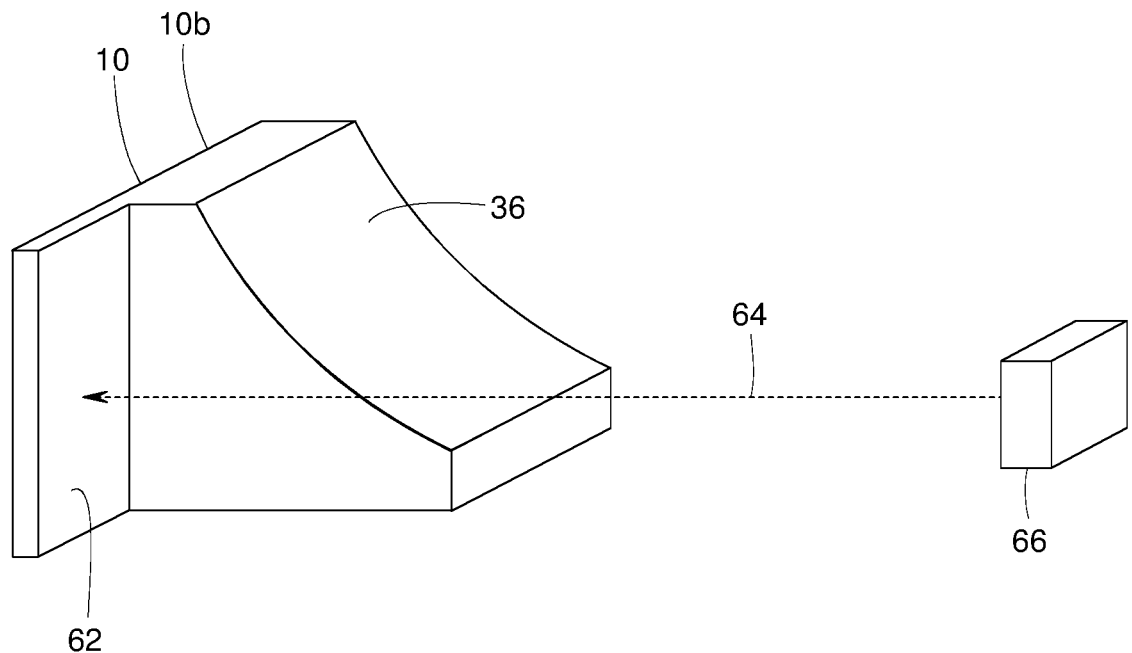
FIG. 5 is a perspective view of another example wheel chock constructed in accordance with the teachings disclosed herein.
Figure 6:
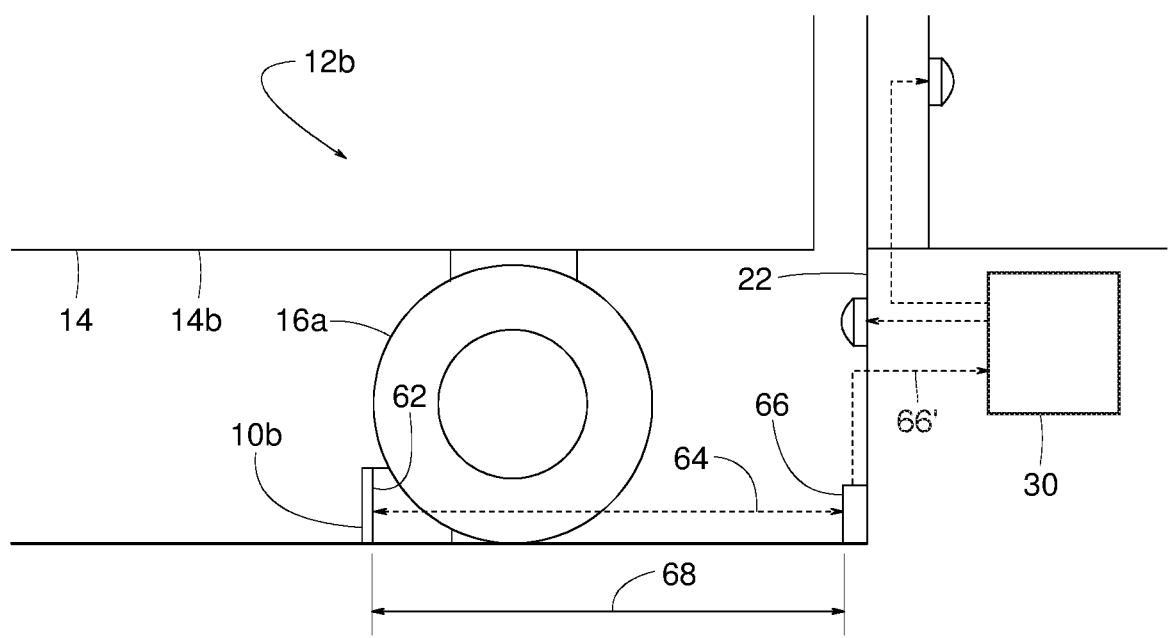
FIG. 6 is a schematic side view similar to FIG. 3, but showing the example loading dock implemented with the example wheel chock shown in FIG. 5.

Referring to FIGS. 5 and 6, the example restraint system 12b includes a wheel chock 10b and a transmitter 66 (e.g., a measurement system). The transmitter 66 establishes a measuring beam or signal 64 relative to a target 62 (e.g., a reflector) to measure a distance 68 between wheel chock 10b and a reference such as, for example, (e.g., a face or wall of) the platform structure 22, the take-up reel 32, the transmitter 66, etc. The transmitter 66 is schematically illustrated to represent various (e.g., wireless) measuring transmissions, examples of which include, but are not limited to, laser transmission, photoelectric transmission, infrared transmission, ultrasonic transmission and/or any other transmission(s). In addition or alternatively, example means for wireless determining a position or location of the wheel chock 10b include transmitting GPS coordinates of the wheel chock 10b, having a limited range Bluetooth and/or other limited range electromagnetic radiation signal projected to and/or from the wheel chock 10b. In the illustrated examples, the transmitter 66 communicates a feedback signal 52' representative of the distance 68 and/or the delta distance 60 (FIG. 4) to the electrical system 30 for the purpose of determining whether to activate alarm 28.

Figure 7:
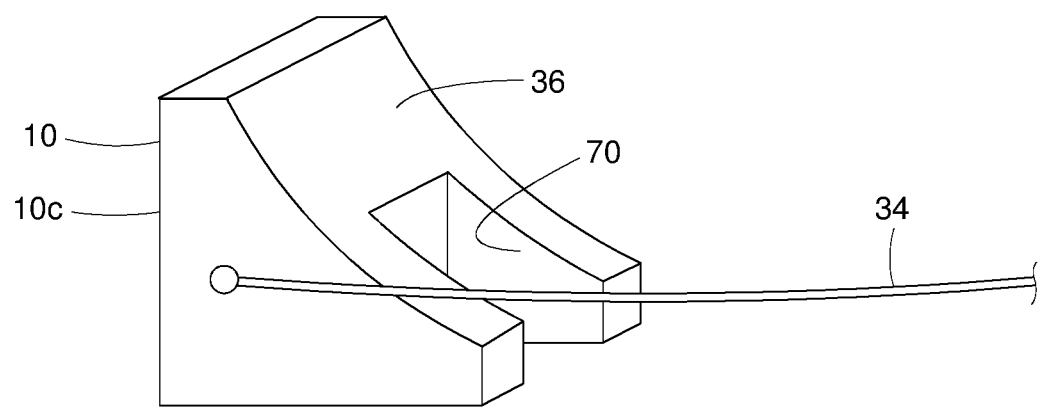
FIG. 7 is a perspective view of another example wheel chock constructed in accordance with the teachings disclosed herein.
Figure 8:
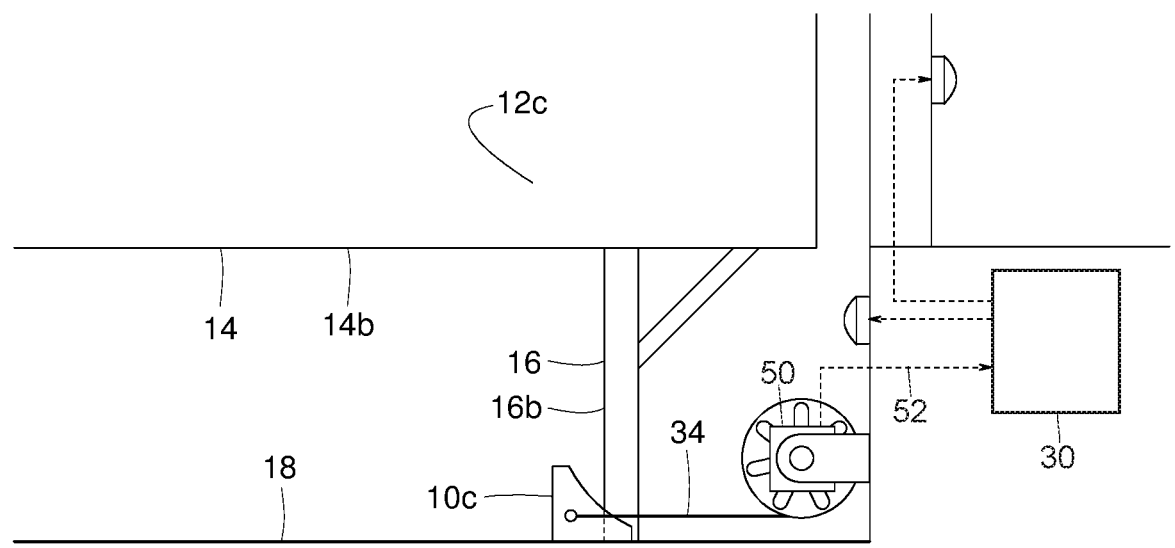
FIG. 8 is a schematic side view similar to FIGS. 3 and 6, but showing the example loading dock implemented with the example wheel chock shown in FIG. 7.

FIGS. 7 and 8 illustrate the wheel chock 10c of the example restraint system 12c monitoring a position of the shipping container 14b relative to a reference (e.g., the face of the platform structure 22, the take-up reel 32). The shipping container 14b of the illustrated example is supported by the leg 16b rather than by the wheel 16a. In this example, the leg 16b fits within a notch 70 of the wheel chock 10c. The operation of the restraint system 12c is similar (e.g., the same) to the operation of the restraint system 12a.

Figure 9:
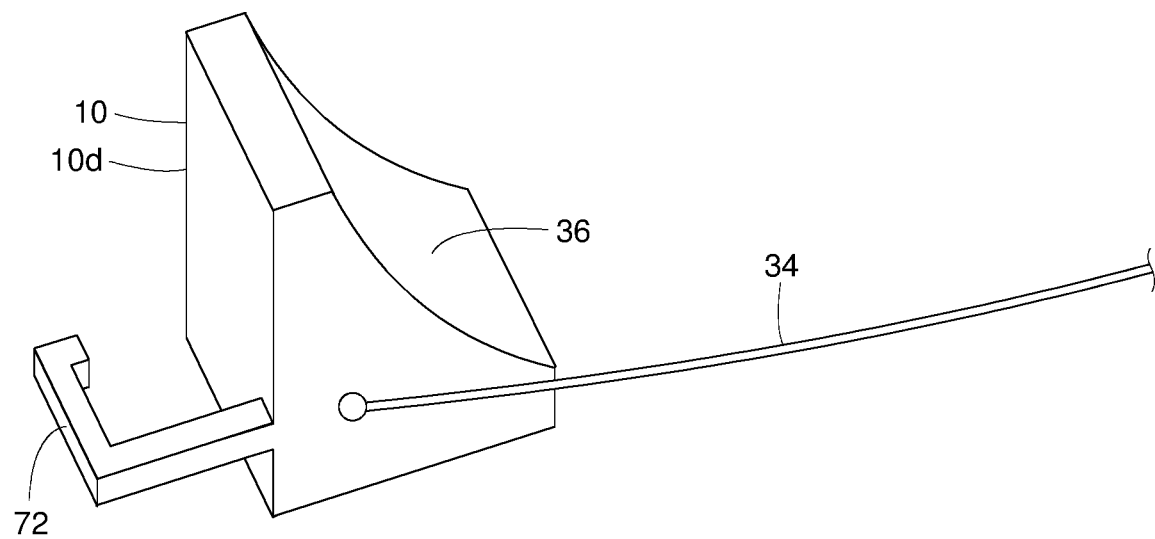
FIG. 9 is a perspective view of another example wheel chock constructed in accordance with the teachings disclosed herein.
Figure 10:
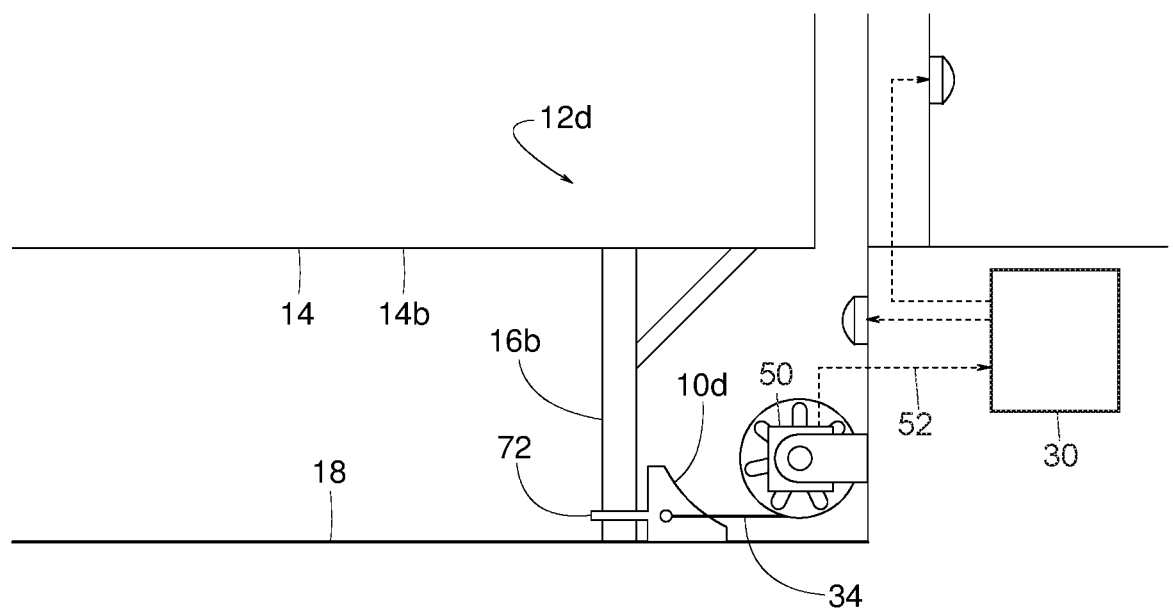
FIG. 10 is a schematic side view similar to FIGS. 3, 6 and 8, but showing the example loading dock implemented with the example wheel chock shown in FIG. 9.

The example restraint system 12d of FIGS. 9 and 10 is similar to the restraint system 12c. However, instead of the notch 70 (e.g., a notched-out portion) the wheel chock 10d of the illustrated example includes a hook 72 that engages or hooks onto the leg 16b. The operation of the restraint system 12d is similar (e.g., the same) to the operation of the restraint systems 12a and 12c.

Figure 11:
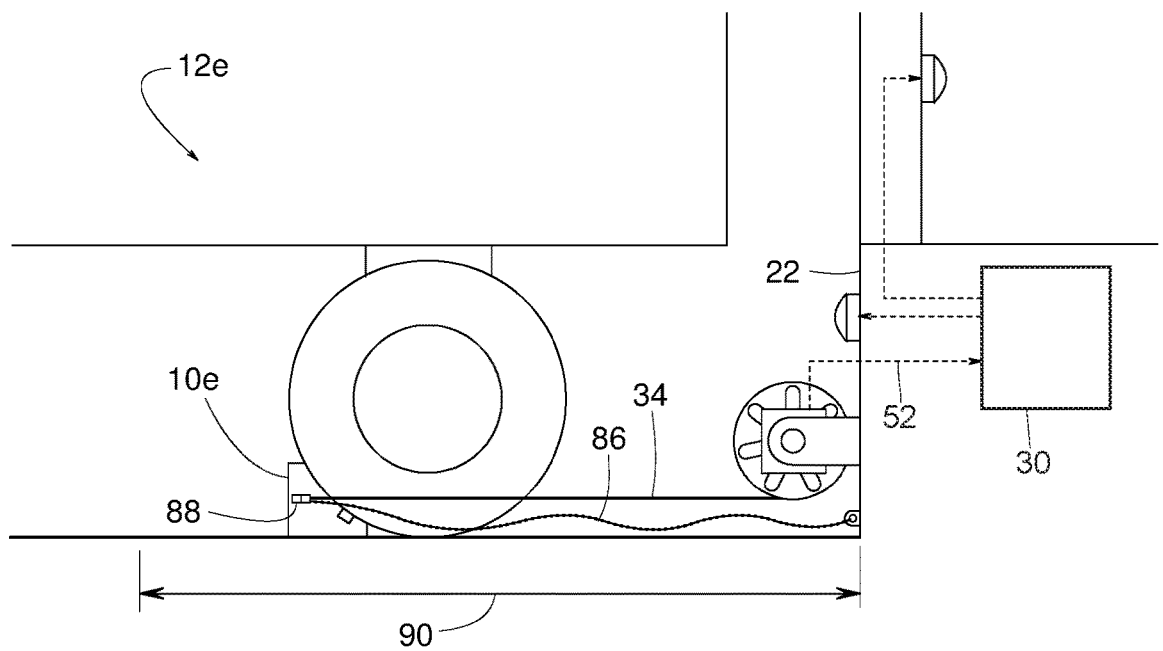
FIG. 11 is a schematic side view similar to FIG. 4 but showing the example loading dock implemented with another example wheel chock constructed in accordance with the teachings disclosed herein, where the wheel chock is shown in an example plugged-in condition.
Figure 12:
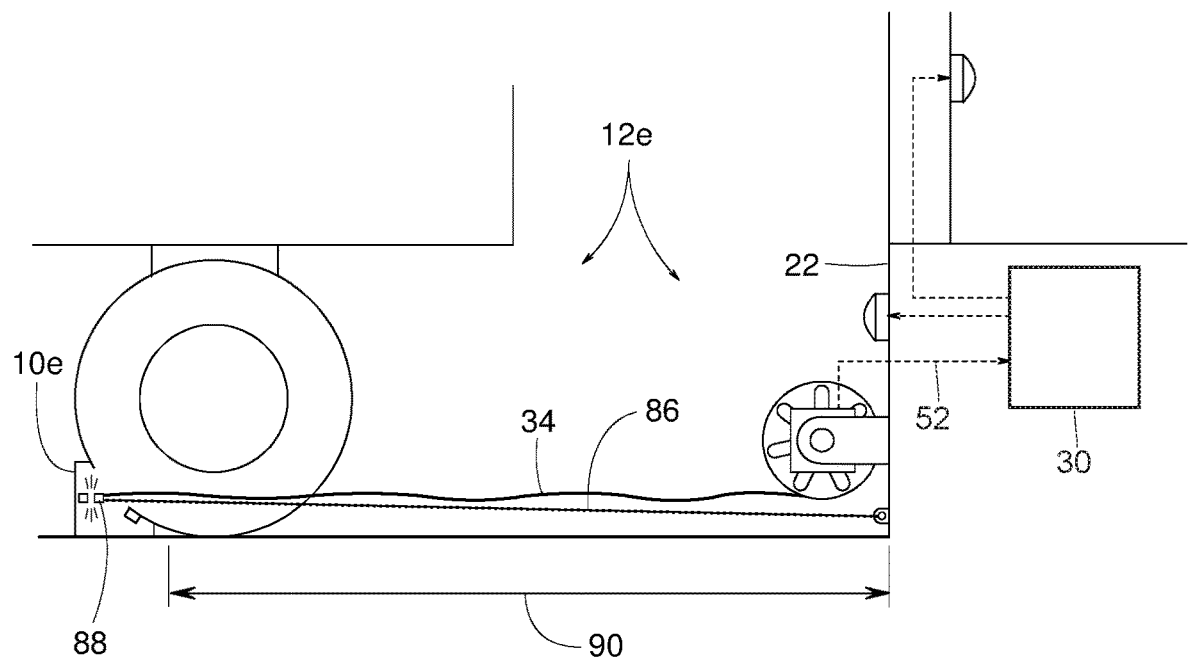
FIG. 12 is a schematic side view similar to FIG. 11 but showing the example wheel chock in an example unplugged condition.

The example restraint system 12e of FIGS. 11 and 12, includes a wheel chock 10e with a protective restraint 86 that automatically decouples or unplugs an electrical plug/socket connection 88 if wheel chock 10e is forced or moved beyond a predetermined (e.g., a maximum) allowable distance 90 (e.g., at least six to twelve feet) from a reference (e.g., a face or wall of platform structure 22). FIG. 11 shows the protective restraint 86 being relatively slack, which allows the connection 88 to remain in a connected state. FIG. 12 shows the protective restraint 86 having reached a maximum extension, thereby pulling connection 88 apart. The protective restraint 86 unplugging connection 88, as shown in FIG. 12, provides a restorable breakaway connection that prevents pulling apart and permanently damaging an electrical cable version of the retractable elongate member 34. In some examples, a take-up reel (e.g., similar to the take-up reel 32) takes up any excess slack in the protective restraint 86. The protective restraint 86 is schematically illustrated to represent any flexible elongate member, examples of which include, but are not limited to, a cable, a chain, a strap, a rope, a wire, a cord, etc.

The example restraint system 12f of FIGS. 13 and 14 includes a wheel chock 10f with an onboard rechargeable electrical power storage device 92 (e.g., a battery, a capacitor, etc.). In some examples, the storage device 92 is electrically connected to some examples of the electrical system 30 and is used for powering one or more elements of the wheel chock 10f without having to remain electrically wired to the stationary or fixed components of the electrical system 30. Examples of elements on the wheel chock 10f that can be powered by the storage device 92 include, but are not limited to, a light 94 (e.g., to signal the wheel chock 10f is engaging the wheel 16a), the blocking position sensor 56, and a wireless transceiver 96 (e.g., for establishing a wireless communication link between the wheel chock 10f and a signal receiver of the electrical system 30).

In some examples, the storage device 92 is wired to a solar collector 98 that recharges the storage device 92. In some examples, to recharge the storage device 92, the wheel chock 10f can be moved from an installed position (FIG. 13) to a stored position (FIG. 14). In the installed position, the storage device 92 electrically couples (e.g., plugs into) and receives restorative electrical power from a recharging station 100.

Figure 15:
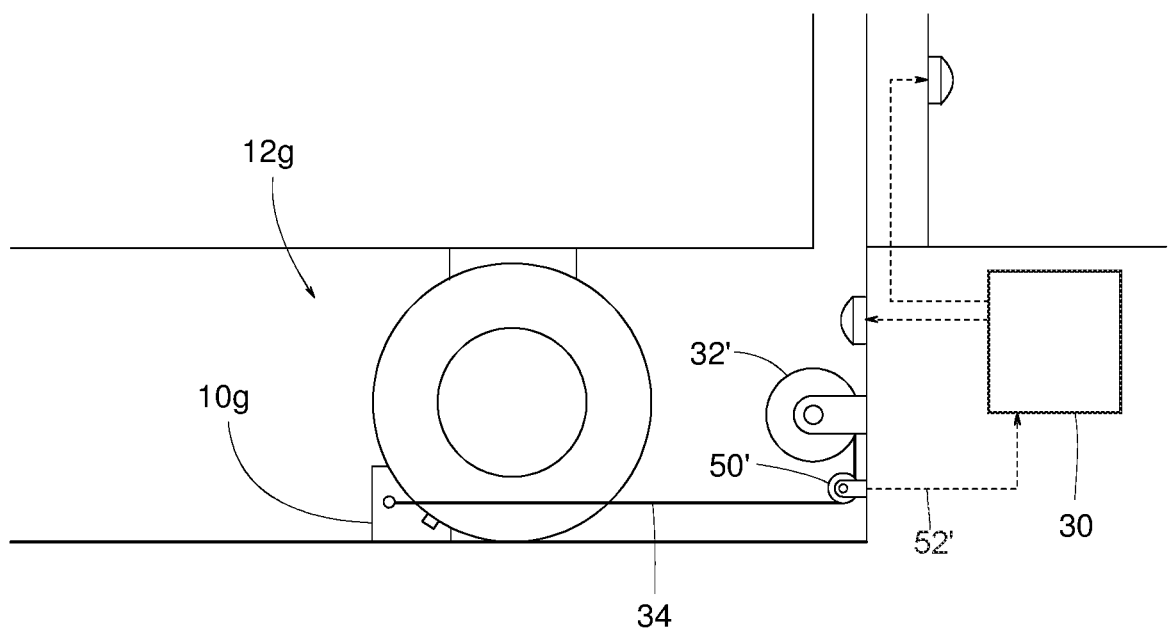
FIG. 15 is a schematic side view similar to FIG. 3 but showing the example loading dock implemented with another example wheel chock constructed in accordance with the teachings disclosed herein.

The example restraint system 12g of FIG. 15 includes the example wheel chock 10g and a rotation sensor 50' that measures the extension of the retractable elongate member 34 between the wheel chock 10g and a take-up reel 32' and provides the feedback signal 52' to the electrical system 30. Examples of the rotation sensor 50' include, but are not limited to, encoders, resolvers, rotating magnet switches, electromechanical magnet switches, rotating Hall Effect devices, a photoelectric eye viewing rotating optical targets, various electrical means for sensing discrete discontinuities a rotating member and/or any other sensor(s). Separating the rotation sensor 50' and the take-up reel 32' may reduce (e.g., minimize) measurement errors that might otherwise be created by multiple wraps of the retractable elongate member 34 around the take-up reel 32'.

Although each example restraint system 12a-12g disclosed above have certain features (e.g., sensors), it should be understood that it is not necessary for a particular feature of one example restraint system 12a-g to be used exclusively with that example. Instead, any of the features of the example restraint systems 12a-g described above and/or depicted in the drawings can be combined with any of the example restraint systems 12a-g, in addition to or in substitution for any of the other features of those examples. One example's features are not mutually exclusive to another example's features. Instead, the scope of this disclosure encompasses any combination of any of the features. In some examples, a restraint system disclosed in accordance with the teachings of this disclosure may have a combination of the features of the example restraint systems 12a-12g disclosed herein.

Figure 16:
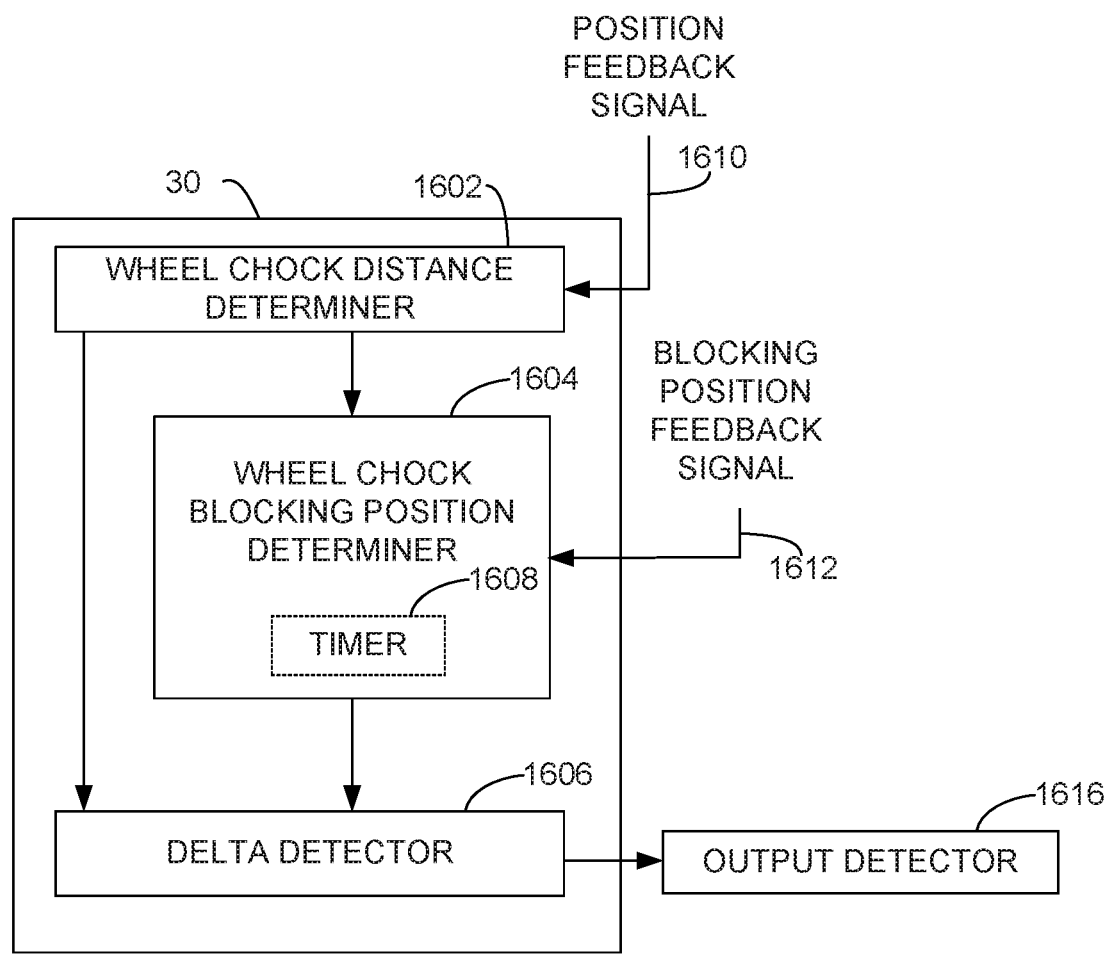
FIG. 16 is a block diagram of an example processor constructed in accordance with the teachings of this disclosure that may implement example restraint systems disclosed herein.

FIG. 16 is a block diagram representative of an example implementation of the example electrical system 30 that may be used to implement the example restraint systems 12 disclosed herein (e.g., the restraint systems 12a-g of FIGS. 1-15). The example electrical system 30 of the illustrated example includes an example wheel chock distance determiner 1602, an example wheel chock blocking position determiner 1604, and an example delta detector 1606. In some examples, the example wheel chock distance determiner 1602, the example wheel chock blocking position determiner 1604 and the example delta detector 1606 of the illustrated example are in communication via a communication bus. In the illustrated example, the wheel chock blocking position determiner 1604 of the illustrated example include a timer 1608. However, as described in greater detail below, in some examples, the wheel chock blocking position determiner 1604 may not include the timer 1608.

As noted above, the electrical system 30 of the illustrated example communicatively couples to one or more sensors of the restraint system 12 such as, for example, the rotational sensors 50, 50', the transmitter 66, transceiver 96, and/or the blocking position sensor 56 of FIGS. 1-15. In some examples, the electrical system 30 of the illustrated example receives, retrieves and/or obtains a position feedback signal 1610 (e.g., the feedback signals 52, 52', 66', 96') and/or a blocking position feedback signal 1612 (e.g., the feedback signal 66') from the one or more rotational sensors 50, 50', the transmitter 66, the transceiver 96, and/or the blocking position sensor 56 of FIGS. 1-15. The electrical system 30 of the illustrated example is communicatively coupled to an output detector 1616, which activates, for example, the alarm 28 and/or any other signaling device(s) of the loading dock 20 based on the position feedback signal 1610 and/or the blocking position feedback signal 1612.

In some examples, the position feedback signal 1610 and/or the blocking position feedback signal 1612 may represent a binary value (e.g., on/off), a digital value, and/or an analog value. Further, one or more sensors providing the position feedback signal 1610 and/or the blocking position feedback signal 1612 are not limited to the example the rotational sensors 50, 50', the transmitter 66, transceiver 96, and/or the blocking position sensor 56 of FIGS. 1-15. In some examples, the one or more sensors of an example restraint system may include one or more sensors that provide the position feedback signal 1610 and/or the blocking position feedback signal 1612 that represent an image, a video and/or any other suitable signal(s).

In operation, the processor 1600 of the illustrated example determines a position or distance (e.g., the distances 76, 82 and 90 of FIGS. 1-15) of the wheel chock 10 relative to an initial position (e.g., a stored position and/or a reference (e.g., a front face of the platform structure 22)). To determine a distance of the wheel chock 10 relative to the initial position, the wheel chock distance determiner 1602 retrieves, receives and/or obtains the position feedback signal 1610.

For example, referring to the example restraint systems 12a of FIGS. 1-4, the example restraint system 12c of FIGS. 7-8, the example restraint system 12d of FIGS. 9-10, and the example restraint system 12g of FIG. 15, to determine a distance (e.g., the first distance 76 of FIG. 2, the second distance 82 of FIG. 3) of the wheel chock 10 relative to the initial position, the wheel chock distance determiner 1602 of the illustrated example receives the feedback signal 52 and 52' from the rotational sensor 50 or 50' in response to the take-up reel 32 or 32' rotating as the wheel chock 10a, 10c, 10d, 10g moves relative to the initial position. In some examples, the wheel chock distance determiner 1602 of the illustrated example receives the feedback signal 66' from the transmitter 66 of the example restraint system 12b of FIGS. 5-6 or the feedback signal 96' from the transceiver 96 of the example restraint system 12f of FIGS. 13-14 to determine a distance between the wheel chock 10b or 10f relative to an initial position (e.g., a stored position). In some examples, the wheel chock distance determiner 1602 receives the feedback signal 52 from the example restraint system 12e of FIGS. 11-12 to determine if the wheel chock 10e is at a position or distance relative to the initial position that is greater than the distance 90.

In some examples, the wheel chock distance determiner 1602 of the illustrated example determines if the distance or position of the wheel chock 10 relative to the initial position is greater than a distance threshold (e.g., between approximately 2 feet and 4 feet). In some such examples, to determine if a distance or position of the wheel chock 10 relative to the initial position is greater than the distance threshold, the wheel chock distance determiner 1602 compares (e.g., via a comparator) the received position feedback signal 1610 to the distance threshold. If the wheel chock distance determiner 1602 of the illustrated example determines that a position of the wheel chock 10 is less than the distance threshold, the wheel chock distance determiner 1602 may deactivate and/or prevent initiation of the alarm 28 via the output detector 1616. For example, if the blocking position sensor 56 is activated (e.g., depressed by, for example, personnel) while the wheel chock 10 is positioned at a distance relative to the initial position that is less than the distance threshold, the delta detector 1606 does not cause the output detector 1616 to activate the alarm 28.

The wheel chock blocking position determiner 1604 of the illustrated example determines if the wheel chock 10 is in a blocking position (e.g., the installed position of FIG. 4). For example, the wheel chock blocking position determiner 1604 of the illustrated example determines if the wheel chock 10 is engaged (e.g., in direct contact) with the wheel 16a or the leg 16b of the freight transporter 14 of FIGS. 1-15. In some examples, the wheel chock blocking position determiner 1604 of the illustrated example determines if the wheel chock 10 is in a fixed or stationary position after the wheel chock distance determiner 1602 determines that the wheel chock 10 is at a position that is greater than the distance threshold.

To determine if the wheel chock 10 is in the blocking position, in some examples, the wheel chock blocking position determiner 1604 of the illustrated example receives, retrieves or obtains position information of the wheel chock 10 from the wheel chock distance determiner 1602 and/or the position feedback signal 1610. Based on the information provided by the wheel chock distance determiner and/or the position feedback signal 1610, the wheel chock blocking position determiner 1604 of the illustrated example determines if the wheel chock 10 is in a fixed or stationary position relative to the initial position when the wheel chock 10 is at a distance or position greater than the distance threshold. In some examples, the wheel chock blocking position determiner 1604 of the illustrated example determines that the wheel chock 10 is in a fixed or stationary position when the wheel chock blocking position determine 1604 detects or receives a consecutive number of position feedback signals 1610 that are relatively constant (e.g., signals having a similar or identical output value(s) and/or characteristic(s)).

In some examples, the wheel chock blocking position determiner 1604 of the illustrated example determines that the wheel chock 10 is in a blocking position (e.g., the installed position of FIG. 3) after the wheel chock 10 is in the fixed position for a period of time that is greater than a pre-determined time threshold (e.g., between approximately 15 seconds and 60 seconds). For example, upon detection of the wheel chock 10 being in a fixed position, the wheel chock blocking position determiner 1604 of the illustrated example initiates the timer 1608 and determines that wheel chock 10 is in the blocking position after the wheel chock 10 is in the fixed position for a period of time greater than the time threshold.

Additionally or alternatively, the wheel chock blocking position determiner 1604 of the illustrated example determines that the wheel chock 10 is in the blocking position via the blocking position feedback signal 1612 (e.g., the feedback signal 56' from the blocking position sensor 56 of FIGS. 1-15). For example, the wheel chock blocking position determiner 1604 of the illustrated example determines that the wheel chock 10 is in a blocking position when the blocking position feedback signal 1612 is representative of the blocking position sensor 56 being in a triggered or activated state and determines that the wheel chock is in a non-blocking position when the blocking position signal 1612 is representative of the blocking position sensor 56 being in a non-triggered or non-activate. In some such examples when the blocking position feedback signal 1612 is employed, the wheel chock blocking position determiner 1604 of the example processor 1600 may not include the timer 1608, may not receive position feedback signals 1610, and/or may not be communicatively coupled to the wheel chock distance determiner 1602.

The delta detector 1606 of the illustrated example determines if a change in position or a distance of the wheel chock 10 relative to the blocking position is greater than a delta threshold (e.g., greater than 6 inches, 1 foot, etc.). The delta detector 1606 causes the output detector 1616 to initiate the alarm 28 when the delta detector 1606 detects a change in position of the wheel chock 10 relative to the blocking position that is greater than the delta threshold. For example, the output detector 1616 of the illustrated example receives communication from the wheel chock distance determiner 1602 and/or the position feedback signal 1610 to determine that a change in position of the wheel chock 10 relative to the blocking position is greater than a delta threshold. For example, referring to the restraint system 12a of FIGS. 1-4, the delta detector 1606 receives information from the wheel chock distance determiner 1602 and/or the feedback signal 52 to determine that the wheel chock 10a moves the delta distance 60 (e.g., the wheel chock 10a moves from the first distance 76 shown in FIG. 3 to the second distance 82 shown in FIG. 4). Referring to the example shown in FIGS. 11-12, to determine if the wheel chock 10e is positioned at a distance greater than the distance 90, the delta detector 1606 receives the feedback signal 52. In turn, the output detector 1616 of the illustrated example imitates the alarm 28 via the output detector 1616.

While an example manner of implementing the electrical system 30 of FIGS. 1-15 is illustrated in FIG. 16, one or more of the elements, processes and/or devices illustrated in FIG. 16 may be combined, divided, re-arranged, omitted, eliminated and/or implemented in any other way. Further, the example wheel chock distance determiner 1602, the example wheel chock blocking position determiner 1604, and the example delta detector 1606 and/or, more generally, the example electrical system 30 of FIG. 16 may be implemented by hardware, software, firmware and/or any combination of hardware, software and/or firmware. Thus, for example, any of the example wheel chock distance determiner 1602, the example wheel chock blocking position determiner 1604, and the example delta detector 1606 and/or, more generally, the example electrical system 30 of FIG. 16 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example wheel chock distance determiner 1602, the example wheel chock blocking position determiner 1604, and the example delta detector 1606 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electrical system 30 of FIGS. 1-16 may include one or more elements, processes and/or devices in addition to, or instead of, those illustrated in FIG. 16, and/or may include more than one of any or all of the illustrated elements, processes and devices.

Flowcharts representative of example machine readable instructions for implementing the example electrical system 30 of FIGS. 1-16 are shown in FIGS. 17-20. In these examples, the machine readable instructions include a program for execution by a processor such as the processor 2112 shown in the example processor platform 2100 discussed below in connection with FIG. 21. The program may be embodied in software stored on a non-transitory computer readable storage medium such as a CD-ROM, a floppy disk, a hard drive, a digital versatile disk (DVD), a Blu-ray disk, or a memory associated with the processor 2112, but the entire program and/or parts thereof could alternatively be executed by a device other than the processor 2112 and/or embodied in firmware or dedicated hardware. Further, although the example programs are described with reference to the flowcharts illustrated in FIGS. 17-20, many other methods of implementing the example electrical system 30 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 17-20 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Figure 17:
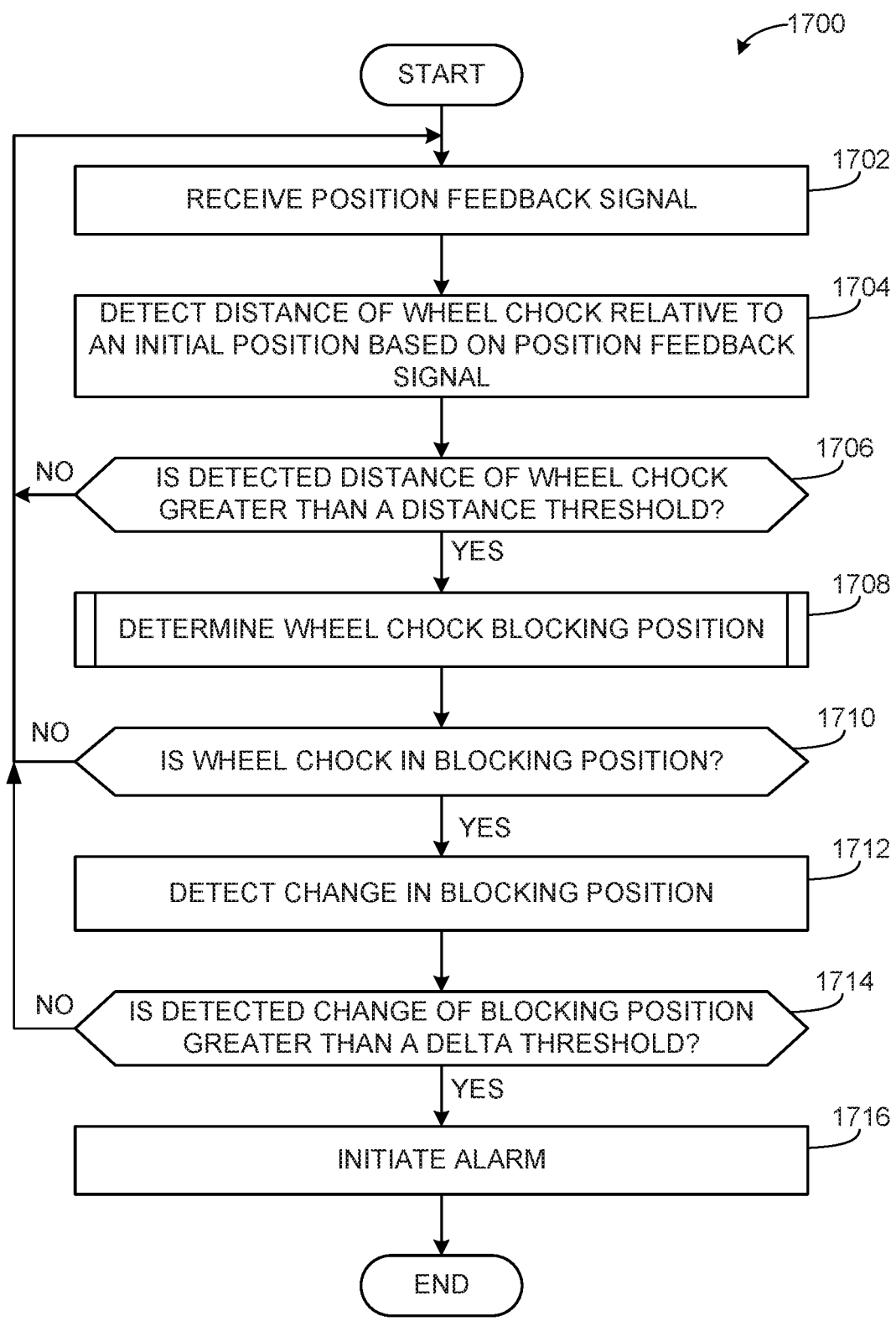
FIG. 17 is a flowchart representative of example machine readable instructions that may be executed to implement example restraint systems disclosed herein.

The program of FIG. 17 begins at block 1702 when the wheel chock distance determiner 1602 receives the position feedback signal 1610. For example, the wheel chock distance determiner 1602 may receive a feedback signal 52 from the rotational sensor 50, the feedback signal 52' from the rotational sensor 50', the feedback signal 66' from the transmitter 66, and/or the feedback signal 96' from the transceiver 96. Based on the position feedback signal 1610, the wheel chock distance determiner 1602 detects a distance of the wheel chock 10 relative to an initial position (block 1704).

The wheel chock distance determiner 1602 determines if the detected distance 68 relative to the initial position is greater than a distance threshold (block 1706). For example, the wheel chock distance determiner 1602 may employ a comparator to compare the position feedback signal (e.g., a voltage signal) to a predetermined position signal threshold (e.g., a predetermined voltage signal) to determine if the detected distance of the wheel chock 10 is greater than the distance threshold. If the detected distance is not greater than the distance threshold at block 1706, then the process 1700 returns to block 1702.

If the detected distance of the wheel chock 10 is greater than the distance threshold at block 1706, the wheel chock blocking position determiner 1604 determines if the wheel chock 10 is in the blocking position (block 1708). Example processes and of FIGS. 18 and 19 may be used to implement block 1708 of the example process 1700. If the wheel chock blocking position determiner 1604 determines that the wheel chock 10 is not in the blocking position (block 1710), the process 1700 returns to block 1702. If the wheel chock blocking position determiner 1604 determines that the wheel chock 10 is in the blocking position (block 1710), the delta detector 1606 detects a change in position or distance of the wheel chock 10 relative to the blocking position (1712).

Specifically, the delta detector 1606 determines if the detected change relative to the blocking position is greater than a delta threshold (block 1714). If the delta detector 1606 determines that the change in position of the wheel chock 10 relative to the blocking position is not greater than a delta threshold at block 1714, the process 1700 returns to block 1702. If the delta detector 1606 determines that the change in position of the wheel chock 10 relative to the blocking position is greater than a delta threshold at block 1714, the delta detector 1606 causes the output detector 1616 to initiate the alarm 28 (block 1716).

Figure 18:
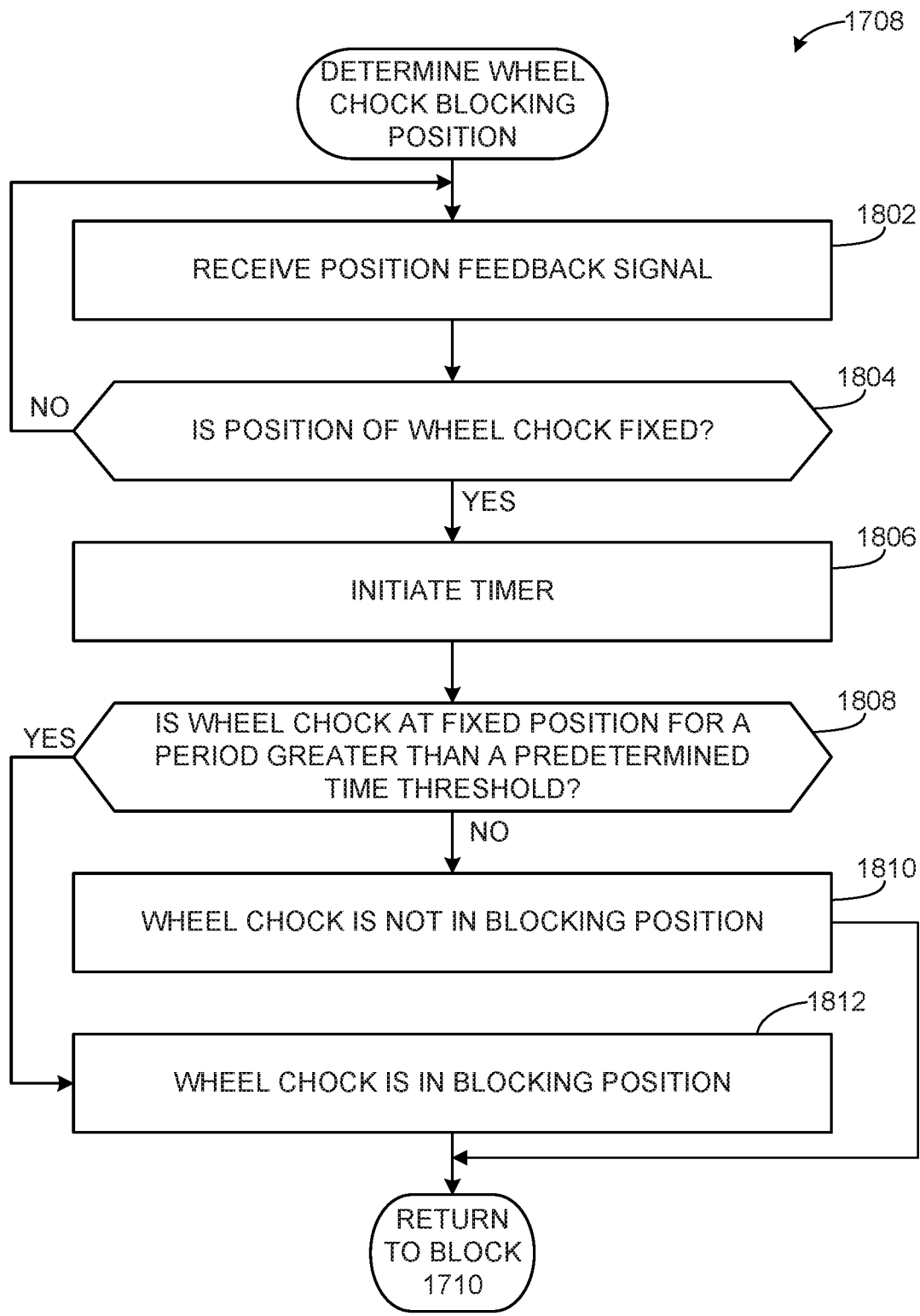
FIG. 18-19 are flowcharts representative of an example process of FIG. 17 to determine a wheel chock blocking position of example restraint systems disclosed herein.

FIG. 18 is a flow diagram illustrating example machine readable instructions which may be executed to implement the wheel chock blocking position at block 1708 of the example flowchart 1700 of FIG. 17. The process of FIG. 18 begins when the wheel chock blocking position determiner 1604 receives distance information from the wheel chock distance determiner 1602 and/or the position feedback signal 1610 (block 1802). Based on the position feedback signal 1610, the wheel chock blocking position determiner 1604 determines if a position of the wheel chock 10 is fixed or stationary (block 1804). For example, to determine of the wheel chock 10 is at a fixed position (e.g., relative to the initial position), the wheel chock blocking position determiner 1604 of the illustrated example detects when a plurality of position feedback signals 1610 are constant (e.g., similar or identical voltage signals). For example, the wheel chock blocking position determiner 1604 may determine that the wheel chock 10 is in the fixed position relative to the initial position when the wheel chock blocking position determiner 1604 receives two or more consecutive signals having the same signal profile.

If the wheel chock blocking position determiner 1604 does not detect that the wheel chock 10 is fixed or stationary at block 1804 (e.g., the plurality of position feedback signals 1610 differ), the process returns to block 1802. If the wheel chock blocking position determiner 1604 determines that the wheel chock 10 is in a fixed position relative to the initial position, the wheel chock blocking position determiner 1604 initiates the timer 1608 (block 1806).

The wheel chock blocking position determiner 1604 determines if the wheel chock 10 is at the fixed position for a period of time that is greater than a predetermined time threshold (block 1808). If the wheel chock blocking position determiner 1604 determines that the wheel chock 10 is at the fixed position for a period greater than the predetermined time threshold at block 1808, the wheel chock blocking position determiner 1604 determines that the wheel chock 10 is in the blocking position (block 1812). If the wheel chock blocking position determiner 1604 determines that the wheel chock 10 is not at the fixed position for a period greater than the predetermined time threshold at block 1808, the wheel chock blocking position determiner 1604 determines that the wheel chock 10 is not in the blocking position (block 1810). The process returns to block 1710.

Figure 19:
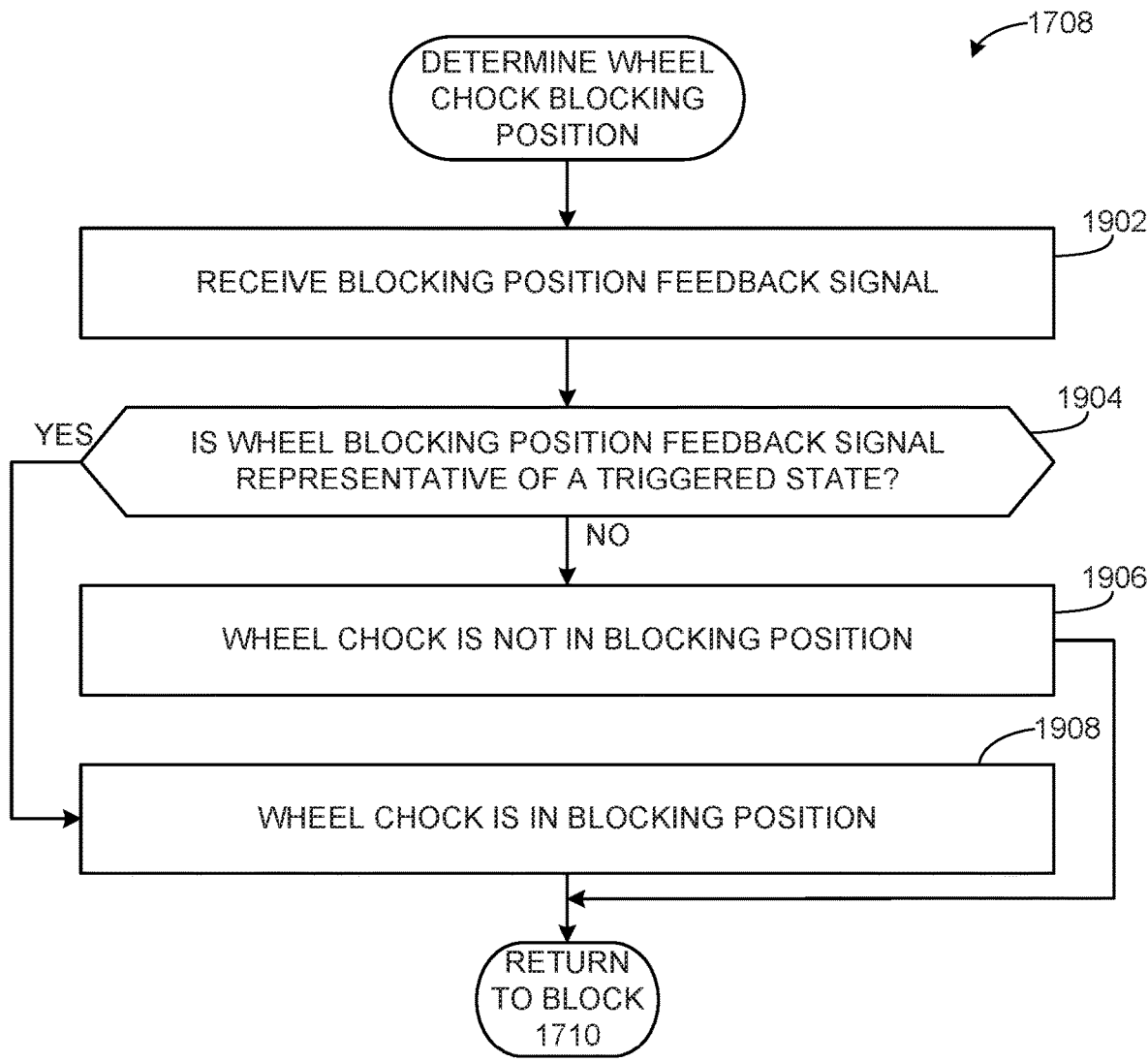

FIG. 19 is a flow diagram illustrating example machine readable instructions which may be executed to determine the wheel chock blocking position at block 1708 of the example flowchart 1700 of FIG. 17. The process of FIG. 19 begins when the wheel chock blocking position determiner 1604 receives the blocking position feedback signal 1612 (block 1902). The wheel chock blocking position determiner 1604 determines if the blocking position feedback signal 1612 is representative of a triggered state (block 1904). If the wheel chock blocking position determiner 1604 determines that the blocking position feedback signal 1612 is not representative of a triggered state at block 1804, the wheel chock blocking position determiner 1604 determines that the wheel chock 10 is not in a blocking position (block 1906). The process then returns to block 1710. If the wheel chock blocking position determiner 1604 determines that the blocking position feedback signal 1612 is representative of a triggered state at block 1804, the wheel chock blocking position determiner 1604 determines that the wheel chock 10 is in a blocking position (block 1908). The process returns to block 1710.

Figure 20:
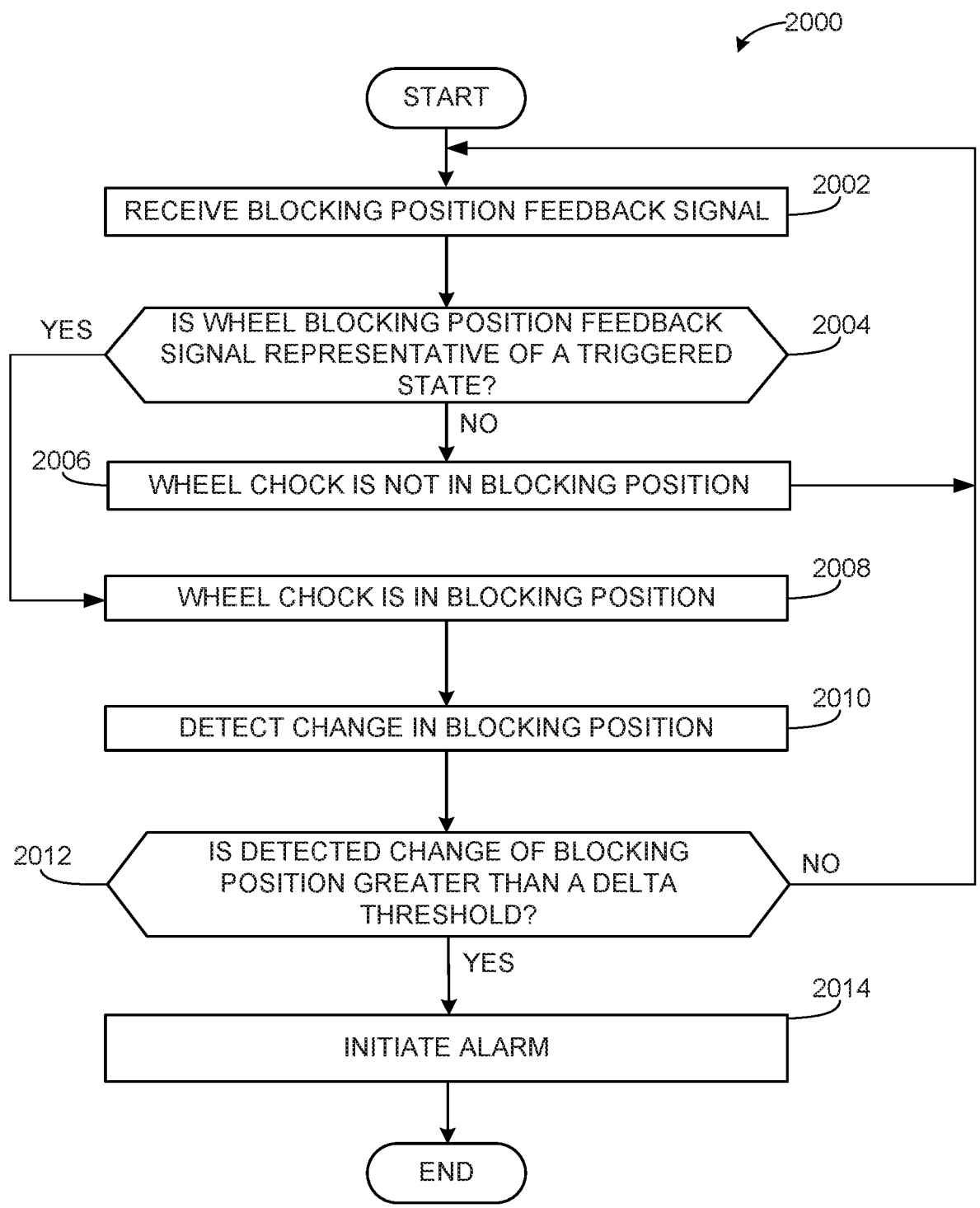
FIG. 20 is a flowchart representative of example machine readable instructions that may be executed to implement example restraint systems disclosed herein.

The program of FIG. 20 begins at block 2002 when the wheel chock blocking position determiner 1604 receives the blocking position feedback sensor 1612. For example, the wheel chock blocking position determiner 1604 receives the blocking position feedback signal 56' from the wheel chock blocking sensor 56.

The wheel chock blocking position determiner 1604 of the illustrated example determines if the wheel blocking position feedback signal 1612 is representative of a triggered or activated state (block 2004). For example, the feedback signal 56' from the wheel chock blocking sensor 56 is indicative of the wheel chock blocking sensor 56 being in a triggered state when the wheel chock blocking sensor 56 is in a depressed state or engaged by the wheel 16a as shown, for example, in FIG. 3 and is indicative of the wheel chock blocking sensor 56 being in a non-triggered state when the wheel chock blocking sensor 56 is in a non-depressed state or disengaged from the wheel 16a as shown, for example, in FIG. 2.

If the feedback signal 1612 is not in a triggered state at block 2004, the wheel chock blocking position determiner 1604 determines that the wheel chock 10 is not in a blocking position (block 2006). The process returns to block 2002. If the feedback signal 1612 is in a triggered state at block 2004, the wheel chock blocking position determiner 1604 determines that the wheel chock 10 is in a blocking position (block 2008).

The wheel block distance determiner 1602 and/or the delta detector 1606 of the illustrated example then determines or detects a change in the blocking position (block 2010). For example, the delta determiner 1606 of the illustrated example receives communication from the wheel chock distance determiner 1602 and/or the position feedback signal 1610 to determine a change in position of the wheel chock 10 relative to the blocking position. In some examples, the delta detector 1606 receives the position feedback signal 1610 (e.g., the position feedback signal 54') to detect the change in the blocking position.

Based on the position of the feedback signal 1610, the delta detector 1606 detects if the change in a distance of the wheel chock 10 relative to the blocking position is greater than a delta threshold (block 2012). In some examples, the delta determiner 1606 determines if a change in a distance of the wheel chock 10 relative to the blocking position is greater than the distance 60 (e.g., greater than 6 inches, 1 foot, etc.). For example, the delta detector 1606 detects the change in the distance 60 after the wheel chock blocking position determiner 1604 determines that the wheel chock 10 is in the blocking position. In some such examples, the wheel block position determiner 1602 receives the feedback signal 52 from the rotary sensor 50 after the wheel chock 10 is determined to be in the blocking position to determine or detect if the wheel chock 10 has moved a distance relative to the blocking position that is greater than the distance 60 shown in FIG. 3.

The delta detector 1606 causes the output detector 1616 to initiate the alarm 28 when the delta detector 1606 detects a change in a distance of the wheel chock 10 relative to the blocking position that is greater than the delta threshold (block 2014). If the detected change is not greater than the delta threshold at block 2012, the process returns to block 2002.

Figure 21:
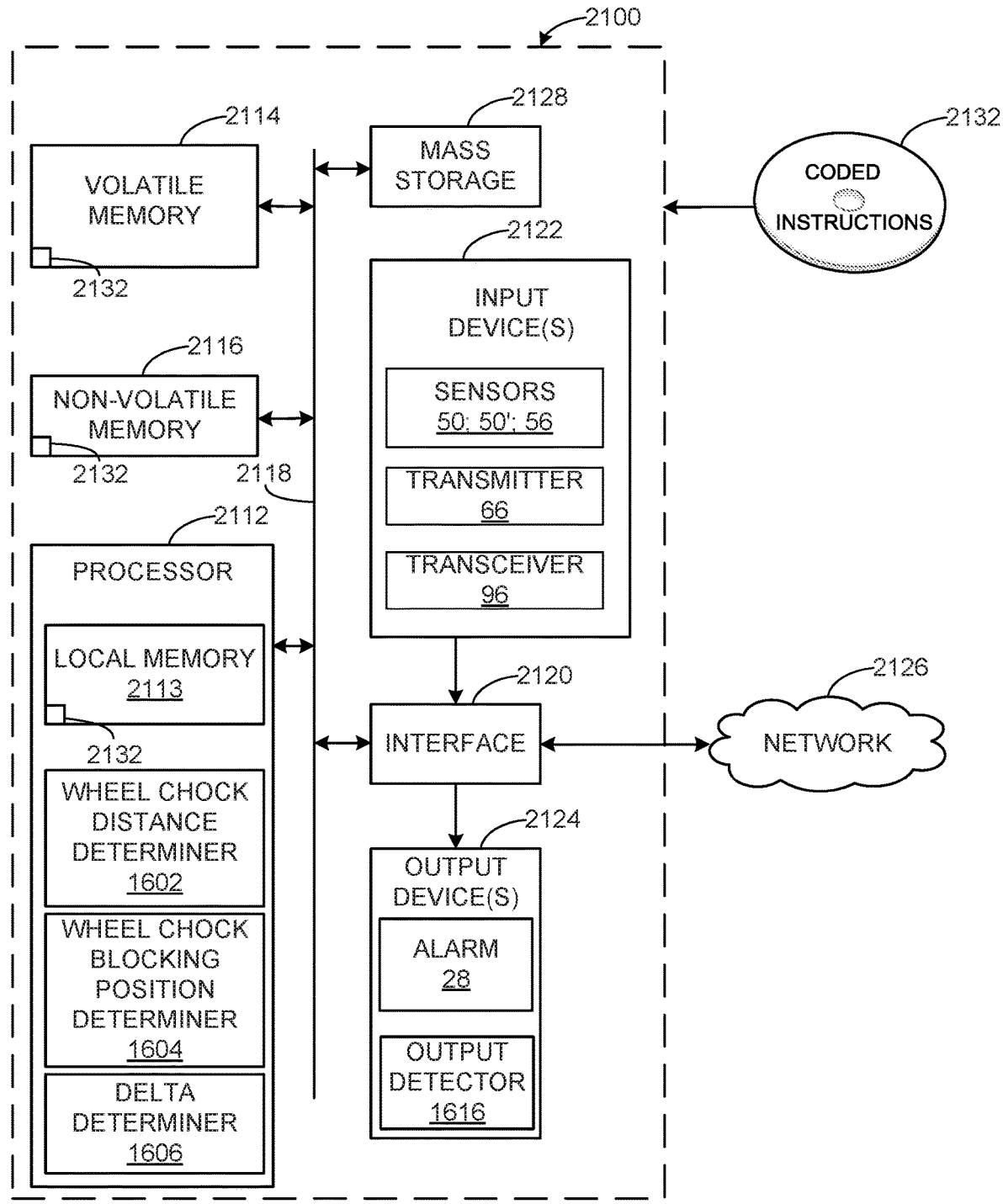
FIG. 21 is a schematic illustration of an example processor platform that may execute the instructions of FIGS. 17-20 to implement the example processor of FIG. 16.

FIG. 21 is a block diagram of an example processor platform 2100 capable of executing the instructions of FIGS. 17-20 to implement the electrical system 30 of FIG. 16. The processor platform 2100 can be, for example, a server, a personal computer, a mobile device (e.g., a cell phone, a smart phone, a tablet such as an iPad™), a personal digital assistant (PDA), an Internet appliance, or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors or controllers from any desired family or manufacturer. The hardware processor may be a semiconductor based (e.g., silicon based) device. In this example, the processor implements the example wheel chock distance determiner 1602, the example wheel chock blocking position determiner 1604 and the example delta detector 1606.

The processor 2112 of the illustrated example includes a local memory 2113 (e.g., a cache). The processor 2112 of the illustrated example is in communication with a main memory including a volatile memory 2114 and a non-volatile memory 2116 via a bus 2118. The volatile memory 2114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2116 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a universal serial bus (USB), and/or a PCI express interface.

In the illustrated example, one or more input devices 2122 are connected to the interface circuit 2120. The input device(s) 2122 permit(s) a user to enter data and/or commands into the processor 2112. The input device(s) can be implemented by, for example, an audio sensor, a microphone, a camera (still or video), a keyboard, a button, a mouse, a touchscreen, a track-pad, a trackball, isopoint and/or a voice recognition system, the rotational sensors 50, 50', the transmitter 66, and/or the transceiver 96.

One or more output devices 2124 are also connected to the interface circuit 2120 of the illustrated example. The output devices 2124 can be implemented, for example, by the alarm 28, display devices (e.g., a light emitting diode (LED), an organic light emitting diode (OLED), a liquid crystal display, a cathode ray tube display (CRT), a touchscreen, a tactile output device, and/or speakers). The interface circuit 2120 of the illustrated example, thus, typically includes a graphics driver card, a graphics driver chip and/or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a digital subscriber line (DSL), a telephone line, coaxial cable, a cellular telephone system, etc.).

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and digital versatile disk (DVD) drives.

The coded instructions 2132 of FIGS. 17-20 may be stored in the mass storage device 2128, in the volatile memory 2114, in the non-volatile memory 2116, and/or on a removable tangible computer readable storage medium such as a CD or DVD.

At least some of the aforementioned examples include one or more features and/or benefits including, but not limited to, the following:

In some examples, a restraint system to restrain or monitor a freight transporter near a platform structure of a loading dock includes a wheel chock having an inclined tire-engaging surface. In some such examples, the wheel chock is movable selectively to a stored position, a wheel blocking position at which the wheel chock is to engage the freight transporter, and a displaced position, where the wheel chock is closer to the platform structure when the wheel chock is in the stored position than when the wheel chock is in the wheel blocking position, and the wheel chock is closer to the platform structure when the wheel chock is in the wheel blocking position than when the wheel chock is in the displaced position. In some such examples, a measurement system is to measure a distance between the wheel chock and a reference to detect if the wheel chock moves a predetermined distance relative to the wheel blocking position.

In some examples, the measurement system includes a take-up reel, and a retractable elongate member to be at least partially wrapped around the take-up reel. In some such examples, the retractable elongate member is to extend between the wheel chock and the platform structure.

In some examples, the take-up reel is mounted at a substantially fixed location proximate the platform structure.

In some examples, the restraint system includes an electrical system responsive to repositioning of the wheel chock, and an alarm emitted by the electrical system in response to the wheel chock being moved from the wheel blocking position to the displaced position. In some such examples, the alarm is inhibited by the electrical system when the wheel chock is in the stored position and the blocking position.

In some examples, the measurement system includes a wireless communication link to enable communication between the wheel chock and the electrical system when the wheel chock is in the blocking position.

In some examples, the retractable elongate member is electrically isolated from the electrical system.

In some examples, the restraint system includes a rotation sensor associated with the take-up reel.

In some examples, the measurement system includes a laser to measure the distance between the wheel chock and the reference.

In some examples, the measurement system includes a photoelectric transmission to measure the distance between the wheel chock and the reference.

In some examples, the measurement system includes an ultrasonic transmission to measure the distance between the wheel chock and the reference.

In some examples, the restraint system includes an alarm to be emitted in response to the measurement system detecting movement of wheel chock beyond the predetermined distance relative to the wheel blocking position.

In some examples, the wheel chock is to engage the freight transporter when the wheel chock is in at least one of the wheel blocking position or the displaced position, and the wheel chock is spaced apart from the freight transporter when the wheel chock is in the stored position.

In some examples, the reference is adjacent the platform structure.

In some examples, a restraint system is to restrain or monitor a freight transporter near a platform structure of a loading dock. In some such examples, the freight transporter includes a support member resting upon a driveway of the loading dock. In some such examples, the restraint system includes a wheel chock having an inclined tire-engaging surface. In some such examples, the wheel chock being positionable selectively between a stored position, an installed position, and a displaced position, where the wheel chock is closer to the platform structure when the wheel chock is in the stored position than when the wheel chock is in the installed position, and the wheel chock is closer to the platform structure when the wheel chock is in the installed position than when the wheel chock is in the displaced position. In some such examples, the wheel chock is to engage the support member of the freight transporter when the wheel chock is in the installed position and the displaced position. In some such examples, the wheel chock is spaced apart from the freight transporter when the wheel chock is in the stored position. In some such examples, a take-up reel mounted at a substantially fixed location proximate the platform structure. In some such examples, a retractable elongate member to be at least partially wrapped around the take-up reel, the retractable elongate member to extend from the take-up reel to the wheel chock. In some such examples, an electrical system with a rotation sensor connected to the take-up reel, the rotation sensor being responsive to extension and retraction of the retractable elongate member. In some such examples, an alarm emitted by the electrical system in response to the wheel chock being moved from the installed position to the displaced position, the alarm being inhibited by the electrical system when the wheel chock is in the stored position and the installed position.

In some examples, the retractable elongate member is electrically isolated from the electrical system.

In some examples, a method to at least one of restrain or monitor a freight transporter parked an initial parked position on a driveway in front of a platform structure of a loading dock includes: determining, by executing an instruction with at least one processor, that a wheel chock is at a blocking position, the wheel chock to engage a support member of the freight transporter at a first distance from the platform structure when the wheel chock is at the blocking position; detecting, by executing an instruction with the processor, movement of the wheel chock from the blocking position to a displaced position in response to the freight transporter moving to a relocated position, the wheel chock being at a second distance from the platform structure when the wheel chock is at the displaced position; determining, by executing an instruction with the processor, a delta distance between first distance and the second distance; determining, by executing an instruction with the processor, if the delta distance is greater than a delta threshold; and emitting, by executing an instruction with the processor, an alarm signal in response to a determination that the delta distance is greater than the delta threshold.

In some examples, the method includes preventing the alarm signal from emitting until after the wheel chock is at the blocking position for at least a predetermined period of time.

In some examples, the method includes preventing the alarm signal from emitting until the wheel chock is at a distance greater than a predetermined distance from the platform structure.

In some examples, the method includes detecting, via a sensor positioned on the wheel chock, whether the wheel chock is engaging the support member of the freight transporter.

In some examples, the method includes the freight transporter is at least one of a vehicle or a shipping container, and the support member is at least one of a wheel of the vehicle or a leg of the shipping container.

In some examples, the method includes extending a retractable elongate member being at least partially wrapped around a take-up reel between the wheel chock and the platform structure.

In some examples, the method includes electrically isolating the retractable elongate member.

In some examples, the method includes extending a retractable elongate member, being at least partially wrapped around a take-up reel, between the wheel chock and the platform structure, wherein extending the retractable elongate member between the wheel chock and the platform structure is to cause rotation of the take-up reel; and detecting movement of the wheel chock via a rotation sensor operatively coupled to the take-up reel.

In some examples, the method includes establishing wireless communication with the wheel chock.

In some examples, the method includes determining that the wheel chock is at the blocking position includes measuring a distance between the wheel chock and a reference.

In some examples, the method includes measuring of the distance between the wheel chock and the reference by measuring the distance via a laser.

In some examples, the method includes measuring of the distance between the wheel chock and the reference by measuring the distance via a photoelectric transmission.

In some examples, the method includes measuring of the distance between the wheel chock and the reference by measuring the distance via an ultrasonic transmission.

In some examples, the method includes positioning the wheel chock to the blocking position, and wherein movement of the freight transporter to the relocated position causes movement of the wheel chock to the displaced position.

In some examples, a restraint system for restraining or monitoring a freight transporter near a platform structure of a loading dock includes a wheel chock having an inclined tire-engaging surface. In some such examples, the wheel chock is positionable between an installed position and a stored position. In some such examples, the wheel chock is to engage the freight transporter when the wheel chock is in the installed position. In some such examples, the wheel chock to be spaced apart from the transporter when the wheel chock is in the stored position. In some such examples, a rechargeable electrical power storage device is borne by the wheel chock.

In some examples, the rechargeable electrical power storage device is a battery.

In some examples, the rechargeable electrical power storage device is a capacitor.

In some examples, a solar collector electrically couples to the rechargeable electrical power storage device.

In some examples, a recharging station is positioned at the loading dock. In some such examples, the wheel chock is to engage the recharging station with the rechargeable electrical power storage device being electrically coupled to the recharging station when the wheel chock is in the stored position. In some such examples, the wheel chock is spaced apart from the recharging station with the rechargeable electrical power storage device being electrically isolated from the recharging station when the wheel chock is in the installed position.

In some examples, a light is borne by the wheel chock and electrically coupled to the rechargeable electrical power storage device.

In some examples, a wheel-sensing switch is borne by the wheel chock and electrically coupled to the rechargeable electrical power storage device.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A restraint system to restrain or monitor a freight transporter near a platform structure of a loading dock, the restraint system comprising:
a wheel chock having a tire-engaging surface, the wheel chock movable between a stored position, a wheel blocking position at which the wheel chock is to engage the freight transporter, and a displaced position, the wheel chock being closer to the platform structure when the wheel chock is in the stored position than when the wheel chock is in the wheel blocking position, the wheel chock being closer to the platform structure when the wheel chock is in the wheel blocking position than when the wheel chock is in the displaced position;
a sensor system to measure a distance between the displaced position and the wheel blocking position; and
a controller to determine if the measured distance is greater than a delta threshold.

2. The restraint system of claim 1, wherein the sensor system includes:
a take-up reel; and
a retractable elongate member to be at least partially wrapped around the take-up reel, the retractable elongate member to extend between the wheel chock and the platform structure.

3. The restraint system of claim 2, wherein the take-up reel is mounted at a substantially fixed location proximate the platform structure.

4. The restraint system of claim 2, wherein the controller is to initiate an alarm in response to determining that the measured distance between the wheel blocking position and the displaced position exceeds the delta threshold, the alarm being inhibited in response to determining that the measured distance between the wheel blocking position and the displaced position does not exceed the delta threshold.

5. The restraint system of claim 4, wherein the sensor system includes a wireless communication link to enable communication between the wheel chock and the controller when the wheel chock is in the blocking position.

6. The restraint system of claim 4, wherein the retractable elongate member is electrically isolated from the controller.

7. The restraint system of claim 4, further comprising a rotation sensor associated with the take-up reel.

8. The restraint system of claim 1, wherein the sensor system includes a laser to measure the distance between the wheel chock and a reference.

9. The restraint system of claim 1, wherein the sensor system includes a photoelectric transmission to measure the distance between the wheel chock and a reference.

10. The restraint system of claim 1, wherein the sensor system includes an ultrasonic transmission to measure the distance between the wheel chock and a reference.

11. The restraint system of claim 1, further including an alarm to be emitted in response to the controller determining that the measured distance between the wheel blocking position and the displaced position exceeds the delta threshold.

12. The restraint system of claim 1, wherein the wheel chock is to engage the freight transporter when the wheel chock is in at least one of the wheel blocking position or the displaced position, and the wheel chock is spaced apart from the freight transporter when the wheel chock is in the stored position.

13. The restraint system of claim 1, wherein the sensor system measures a distance between the wheel chock and a reference adjacent the platform structure to sense movement of the wheel chock to at least one of the wheel blocking position or the displaced position.

14. The restraint system of claim 1, wherein the wheel chock is to engage the freight transporter when the wheel chock is in the displaced position.

15. A restraint system to restrain or monitor a freight transporter near a platform structure of a loading dock, the freight transporter including a support member resting upon a driveway of the loading dock, the restraint system comprising:
a wheel chock having an inclined tire-engaging surface, the wheel chock being positionable between a stored position and an installed position, the wheel chock being closer to the platform structure when the wheel chock is in the stored position than when the wheel chock is in the installed position, wherein the wheel chock is capable of moving from the installed position to a displaced position, the wheel chock being closer to the platform structure when the wheel chock is in the installed position than when the wheel chock is in the displaced position, the wheel chock to engage the support member of the freight transporter when the wheel chock is in the installed position and the displaced position, the wheel chock being spaced apart from the freight transporter when the wheel chock is in the stored position;

a take-up reel mounted at a substantially fixed location proximate the platform structure;

a retractable elongate member to be at least partially wrapped around the take-up reel, the retractable elongate member to extend from the take-up reel to the wheel chock;

an electrical system with a rotation sensor connected to the take-up reel, the rotation sensor being responsive to extension and retraction of the retractable elongate member, the electrical system to determine if a distance between the installed position and the displaced position exceeds a delta threshold; and an alarm to be emitted by the electrical system in response to the distance between the installed position and the displaced position exceeding the delta threshold, the alarm to be inhibited by the electrical system when the wheel chock is in the stored position and the installed position.

16. The restraint system of claim 15, wherein the retractable elongate member is electrically isolated from the electrical system.

17. A restraint system for restraining or monitoring a freight transporter near a platform structure of a loading dock, the restraint system comprising:

a wheel chock having a tire-engaging surface, the wheel chock being positionable between an installed position and a stored position, the wheel chock to engage the freight transporter when the wheel chock is in the installed position, the wheel chock to be spaced apart from the freight transporter when the wheel chock is in the stored position; and a controller to:

detect a first distance between the wheel chock and a reference when the wheel chock is in the installed position;

detect a second distance between the wheel chock and the reference when the wheel chock is in a displaced position, the displaced position being farther away from the platform structure than the installed position;

determine a difference between the first distance and the second distance;

compare the difference to a delta threshold; and initiate an alarm in response to the difference exceeding the delta threshold and deactivate an alarm in response to the difference not exceeding the delta threshold.

18. The restraint system of claim 17, wherein the wheel chock includes a rechargeable electrical power storage device.

19. The restraint system of claim 18, wherein the rechargeable electrical power storage device is a battery.

20. The restraint system of claim 18, wherein the rechargeable electrical power storage device is a capacitor.

21. The restraint system of claim 18, further comprising a solar collector electrically coupled to the rechargeable electrical power storage device.

22. The restraint system of claim 18, further comprising a recharging station at the loading dock, the wheel chock to engage the recharging station with the rechargeable electrical power storage device being electrically coupled to the recharging station when the wheel chock is in the stored position, and the wheel chock being spaced apart from the recharging station with the rechargeable electrical power storage device being electrically isolated from the recharging station when the wheel chock is in the installed position.

23. The restraint system of claim 18, further comprising a light borne by the wheel chock and electrically coupled to the rechargeable electrical power storage device.

24. The restraint system of claim 18, further comprising a wheel-sensing switch borne by the wheel chock and electrically coupled to the rechargeable electrical power storage device.

* * * * *